(12) United States Patent
Ebihara et al.

(10) Patent No.: US 12,223,145 B2
(45) Date of Patent: Feb. 11, 2025

(54) MOVEMENT CONTROL APPARATUS AND MOVABLE BODY

(71) Applicant: Sony Group Corporation, Tokyo (JP)

(72) Inventors: Munetake Ebihara, Tokyo (JP); Toshiaki Nishikawa, Tokyo (JP); Akira Fujisawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 385 days.

(21) Appl. No.: 17/600,680

(22) PCT Filed: Mar. 16, 2020

(86) PCT No.: PCT/JP2020/011389
§ 371 (c)(1),
(2) Date: Oct. 1, 2021

(87) PCT Pub. No.: WO2020/209011
PCT Pub. Date: Oct. 15, 2020

(65) Prior Publication Data
US 2022/0171480 A1 Jun. 2, 2022

(30) Foreign Application Priority Data
Apr. 8, 2019 (JP) ................................. 2019-073513

(51) Int. Cl.
*B60W 60/00* (2020.01)
*B60R 13/02* (2006.01)
(Continued)

(52) U.S. Cl.
CPC ........... *G06F 3/044* (2013.01); *B60W 60/001* (2020.02); *B60W 2540/215* (2020.02); *G06F 2203/04104* (2013.01); *G06F 2203/04105* (2013.01)

(58) Field of Classification Search
None
See application file for complete search history.

(56) References Cited

U.S. PATENT DOCUMENTS

2009/0189874 A1* 7/2009 Chene ............... H04M 1/72439
345/173
2016/0109311 A1* 4/2016 Inazumi .................. G01L 5/226
73/862.042
(Continued)

FOREIGN PATENT DOCUMENTS

JP H02-282568 A 11/1990
JP 2007-093259 A 4/2007
(Continued)

OTHER PUBLICATIONS

International Search Report issued in International Patent Application No. PCT/JP2020/011389 on Jun. 9, 2020 and English translation of same. 7 pages.

(Continued)

*Primary Examiner* — Jonathan M Dager
*Assistant Examiner* — Laura E Linhardt
(74) *Attorney, Agent, or Firm* — K&L Gates LLP

(57) ABSTRACT

[Object] To provide a movement control apparatus that is capable of controlling the movement of a movable body using an intuitive operation, and the movable body.
[Solving Means] A movement control apparatus according to the present technology includes a motion controller and an operation instructing section. The motion controller causes a movable body to perform motion. The operation instructing section gives an instruction to the motion controller on the basis of output of a sensor such that the movable body performs motion, the sensor detecting a distribution of pressure applied to a detection surface.

18 Claims, 20 Drawing Sheets

(51) Int. Cl.
  *B60R 16/037*   (2006.01)
  *B60W 30/18*    (2012.01)
  *B60W 50/16*    (2020.01)
  *G06F 3/044*    (2006.01)
  *H04L 29/06*    (2006.01)
  *H04L 29/08*    (2006.01)

(56) References Cited

U.S. PATENT DOCUMENTS

2018/0288116 A1* 10/2018 Asnis ............... H04N 21/42203
2019/0135199 A1*  5/2019 Galan Garcia ........ B60K 35/00
2020/0097001 A1*  3/2020 Lavoie ................. G05D 1/0038
2020/0269870 A1*  8/2020 Verbeke ................. B60K 35/10

FOREIGN PATENT DOCUMENTS

| JP | 2009-142901 A | 7/2009 |
| JP | 2009-294140 A | 12/2009 |
| JP | 2011-054116 A | 3/2011 |
| JP | 2013-096870 A | 5/2013 |
| JP | 2014-163815 A | 9/2014 |
| JP | 2018-018987 A | 2/2018 |
| JP | 2018-180987 A | 11/2018 |

OTHER PUBLICATIONS

Written Opinion issued in International Patent Application No. PCT/JP2020/011389 on Jun. 9, 2020. 4 pages.

* cited by examiner

| Movable body:<br>· Fully autonomous driving<br>· Robot car, etc. | Instruction block:<br>· Distinguish passenger or person to be transported, and understand intention<br>· Indicate destination and behavior<br>· Give instruction regarding movement without taking into consideration inclination, load weight, and center of gravity<br>· Not ensure safety of person/vehicle<br>· Gesture UI using camera, microphone, and touch panel<br>· Connected to dispatching application and map application | Driving block:<br>· Understand order issued by instruction block<br>· Recognize state and perform safe and comfortable operation<br>· Recognize, for example, inclination, load weight, and center of gravity, which makes it possible to move according to instruction<br>· Ensure safety of person/vehicle<br>· Safe traveling using, for example, laser scanner, millimeter-wave radar, and camera<br>· Two-way communication with surrounding vehicle and signal device |
|---|---|---|
| General automobile<br>· Taxi<br>· Sightseeing bus, etc. | · Taxi dispatching application<br>· Conductor of sightseeing bus<br>· Car navigation | · Driver |

FIG.7

MOVEMENT CONTROL APPARATUS AND MOVABLE BODY

TECHNICAL FIELD

The present technology relates to a movement control apparatus related to control of a motion of a movable body, and the movable body.

BACKGROUND ART

In recent years, movable bodies, such as an autonomous vehicle and a delivery robot that can be autonomously driven, have been developed. Various approaches have been discussed that include moving such a movable body in autonomous driving and stopping the movable body in a specified position (refer to, for example, Patent Literatures 1 and 2).

In some cases, a user wishes to perform an operation regarding the movement of a movable body, such as correcting a stop position, or putting a car into a small garage, or taking a car out of a small garage. Thus, a technology has been developed that makes it possible to perform an operation regarding the movement of a movable body using, for example, a smartphone, or a touch sensor included in the movable body.

CITATION LIST

Patent Literature

Patent Literature 1: Japanese Patent Application Laid-open No. 2018-180987
Patent Literature 1: Japanese Patent Application Laid-open No. 2011-54116

DISCLOSURE OF INVENTION

Technical Problem

However, an operation performed using, for example, a touch panel does not provide intuitive operability, and this may cause anxiety to an operator or people around the operator. Further, when multiple people attempt to perform an operation, it is not clear who is performing the operation, and this may also cause anxiety. Furthermore, when a touch sensor provided on the outer surface of a movable body is operated, a movement direction and the like are indicated by moving a contact position. The movable body moves with the touch sensor due to the operation, and this results in difficulty in continuing an operation input.

In view of the circumstances described above, an object of the present technology is to provide a movement control apparatus that is capable of controlling the movement of a movable body using an intuitive operation, and the movable body.

Solution to Problem

In order to achieve the object described above, a movement control apparatus according to the present technology includes a motion controller and an operation instructing section.

The motion controller causes a movable body to perform motion.

The operation instructing section gives an instruction to the motion controller on the basis of output of a sensor such that the movable body performs motion, the sensor detecting a distribution of pressure applied to a detection surface.

The operation instructing section may acquire the distribution of the pressure and a shearing force from the sensor, the pressure being a force in a direction orthogonal to the detection surface, the shearing force being a force in a direction parallel to the detection surface, and the operation instructing section may give the instruction to the motion controller on the basis of the pressure and the shearing force.

When the pressure or the shearing force is applied to the detection surface in a traveling direction of the movable body while the movable body is stopped, the operation instructing section may give the instruction to the motion controller such that the movable body starts moving.

When the pressure or the shearing force is applied to the detection surface in a direction opposite to the traveling direction of the movable body while the movable body is moving, the operation instructing section may give the instruction to the motion controller such that the movable body is stopped.

When the pressure or the shearing force is applied to the detection surface, the operation instructing section may give the instruction to the motion controller while the pressure or the shearing force is being applied, such that the movable body moves in a direction in which the pressure or the shearing force is being applied.

From the distribution of the pressure applied to the detection surface, the operation instruction section may acquire the type of a pressing object pressed against the detection surface, and the number of the pressing objects, and the operation instruction section may give the instruction to the motion controller according to the type of the pressing object and the number of the pressing objects.

When the pressing object is a certain number of fingers or more, or a palm of a hand, the operation instructing section may give the instruction to the motion controller according to the output of the sensor, and when the pressing object is fewer than the certain number of fingers, the operation instructing section does not have to give the instruction to the motion controller according to the output of the sensor.

When the pressing object is a single hand, the operation instructing section may give the instruction to the motion controller such that the movable body goes straight, and when the pressing object is a plurality of hands, the operation instructing section may give the instruction to the motion controller such that the movable body moves with a turn.

The operation instructing section may identify a user who is pressing the detection surface, may determine a set value according to a result of the identification, and may give the instruction to the motion controller on the basis of the output of the sensor when the pressure or the shearing force exhibits a value greater than the set value.

When the detection surface is pressed in a state in which a destination of the movable body in autonomous driving has been set, the operation instructing section may give the instruction to the motion controller such that the movable body moves toward the destination.

When the detection surface is pressed after the movable body leaves for the destination, the operation instructing section may give the instruction to the motion controller such that the movable body is stopped.

According to an angle formed by the detection surface and a movement direction that is a direction in which the movable body is movable, the operation instructing section may select a force used to give the instruction to the motion controller from the pressure and the shearing force.

When the detection surface is parallel to the movement direction, the operation instructing section may use the shearing force to give the instruction to the motion controller, and when the detection surface is orthogonal to the movement direction, the operation instructing section may use the pressure, and the shearing force in a direction parallel to the movement direction to give the instruction to the motion controller.

When the detection surface is pressed with a pressing object while the movable body is moving, the operation instructing section may give the instruction to the motion controller such that the movable body moves while keeping in contact with the pressing object.

In order to achieve the object described above, a movable body according to the present technology includes a sensor, a traveling apparatus, a motion controller, and an operation instructing section.

The sensor detects a distribution of pressure applied to a detection surface.

The traveling apparatus causes the movable body to perform motion.

The motion controller controls the traveling apparatus such that the movable body performs motion.

The operation instructing section gives an instruction to the motion controller on the basis of output of the sensor such that the movable body performs motion.

The sensor may include a shearing force detecting sensor that detects a shearing force, and a pressure distribution detecting sensor that is stacked on the shearing force detecting sensor and detects the distribution of the pressure, the shearing force being a force in a direction parallel to the detection surface, the pressure being a force in a direction orthogonal to the detection surface.

The sensor may include a pressure-and-shearing-force detecting sensor that detects the pressure and a shearing force, and a touch sensor that is stacked on the pressure-and-shearing-force detecting sensor and detects a contact with the detection surface, the pressure being a force in a direction orthogonal to the detection surface, the shearing force being a force in a direction parallel to the detection surface.

The sensor may include a pressure distribution detecting sensor that detects the distribution of the pressure, and a shearing force detecting electrode that is arranged around the pressure distribution detecting sensor and detects displacement of the pressure distribution detecting sensor, the pressure being a force in a direction orthogonal to the detection surface, the displacement being displacement in a direction parallel to the detection surface.

The sensor may include a transparent member that includes the detection surface, and an image sensor that converts, into an image, a change in a shape of a pressing object pressed against the detection surface, the sensor detecting the pressure and a shearing force on the basis of the change in the shape of the pressing object, the pressure being a force in a direction orthogonal to the detection surface, the shearing force being a force in a direction parallel to the detection surface.

The movable body may be an autonomous vehicle, or a robot including an autonomous movement function.

BRIEF DESCRIPTION OF DRAWINGS

FIG. 7 is a table of functions of the instruction block and the driving block that are included in the movable body.

MODE(S) FOR CARRYING OUT THE INVENTION

A movable body according to embodiments of the present technology is described.

[Configuration of Movable Body]

Figure 1:
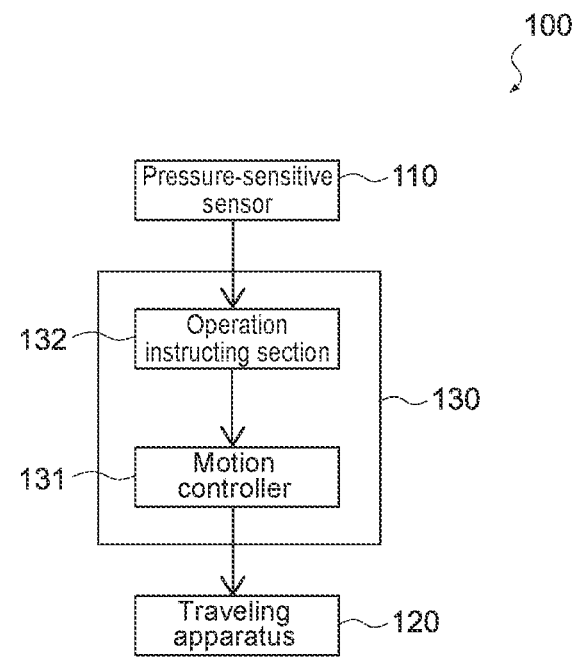
FIG. 1 is a block diagram illustrating a schematic configuration of a movable body according to embodiments of the present technology.

FIG. 1 is a block diagram illustrating a schematic configuration of a movable body 100 according to the present embodiment. As illustrated in the figure, the movable body 100 includes a pressure-sensitive sensor 110, a traveling apparatus 120, and a movement control apparatus 130.

The movable body 100 is an object that is capable of moving autonomously, and is, for example, an autonomous vehicle, or a robot including an autonomous movement function (hereinafter referred to as a self-propelled robot). Examples of the autonomous vehicle include a fully autonomous vehicle and a vehicle including a function of assisting in vehicle parking. Further, examples of the self-propelled robot include a delivery robot, a self-propelled workbench, and a self-propelled roller case.

Figure 2:
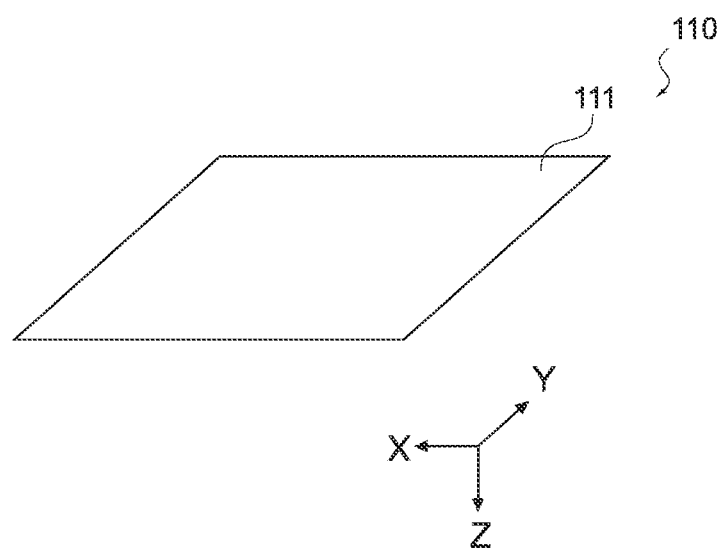
FIG. 2 schematically illustrates a detection surface of a pressure-sensitive sensor that is included in the movable body.

The pressure-sensitive sensor 110 is included in the movable body 100, and detects a distribution of pressure applied to a detection surface. FIG. 2 schematically illustrates a detection surface 111 that is included in the pressure-sensitive sensor 110. As illustrated in the figure, two directions that are orthogonal to each other and are each parallel to the detection surface 111, are respectively referred to as an X-direction and a Y-direction. In other words, the detection surface 111 is parallel to an XY-plane. Further, a direction that is orthogonal to the X-direction and the Y-direction is referred to as a Z-direction.

The pressure-sensitive sensor 110 detects at least a distribution of pressure applied to the detection surface 111, that is, a distribution of pressure applied in the Z-direction, the distribution of pressure being a distribution on the detection surface 111 (in the XY-plane). Further, it is favorable that the pressure-sensitive sensor 110 be capable of detecting a shearing force with respect to the detection surface 111, that is, a friction force applied to the detection surface 111 in the X-direction and in the Y-direction.

For example, when a user presses the palm of the hand against the detection surface 111, the pressure-sensitive sensor 110 detects a distribution of pressure applied along a shape of the palm of the hand. Further, when the user applies a force along the detection surface 111 while pressing the palm of the hand against the detection surface 111, the pressure-sensitive sensor 110 detects a shearing force. Note that, in the following description, a pressing force includes pressure and a shearing force. Further, an object, such as the finger and the palm of the hand, that is pressed against the detection surface 111 is referred to as a pressing object.

A specific structure of the pressure-sensitive sensor 110 will be described later. Note that the detection surface 111 has been described above as a planar surface, but the detection surface 111 may be a curved surface and may be a surface along a surface shape of the movable body 100.

Figure 3:
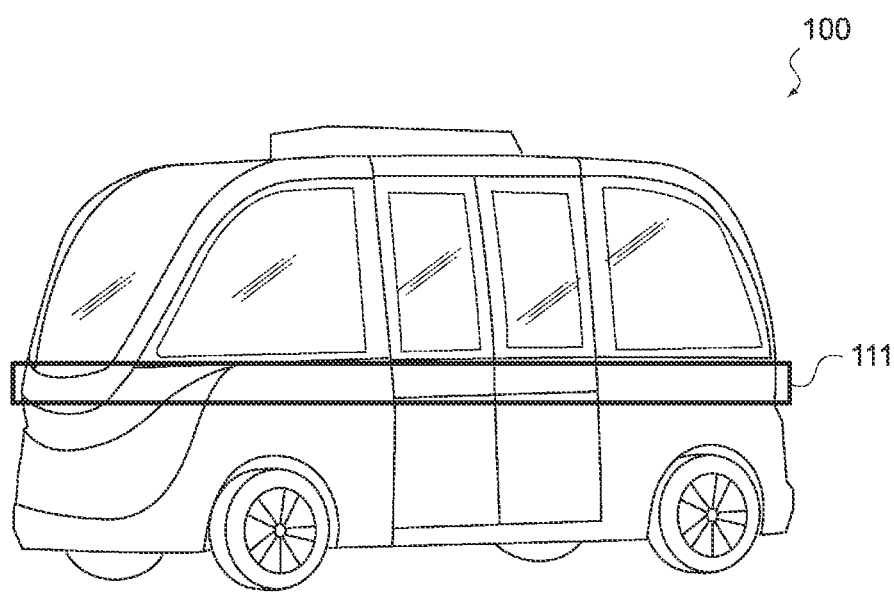
FIG. 3 schematically illustrates an arrangement of the detection surface in the movable body.

FIG. 3 schematically illustrates an arrangement example of the detection surface 111 in the movable body 100. For example, the detection surface 111 may be arranged on an outer peripheral surface of the movable body 100, as illustrated in the figure. Since the detection surface 111 is operated by being touched with the hand of a user, it is favorable that the detection surface 111 be arranged in a portion, in the outer periphery of the movable body 100, that the user can easily touch with the hand. When the movable body 100 is an automobile, it is favorable that the detection surface 111 be arranged over the entire periphery of the movable body 100 such as a front surface, a rear surface, a left side surface, and a right side surface.

The traveling apparatus 120 is controlled by the movement control apparatus 130 to cause the movable body 100 to perform motion. Examples of the motion include various behavior, such as a start of moving, a stop, acceleration, deceleration, and steering of the movable body 100, that can be performed by the movable body 100.

The movement control apparatus 130 is included in the movable body 100, and performs control processing related to the motion of the movable body 100. As illustrated in FIG. 1, the movement control apparatus 130 includes an operation instructing section 131 and a motion controller 132.

The operation instructing section 131 gives an instruction to the motion controller 132 such that the movable body 100 performs motion. For example, when the operation instructing section 131 acquires a destination of the movable body 100 through, for example, a user interface (UI) input/output apparatus or an application of a smartphone, the operation instructing section 131 indicates the destination to the motion controller 132. Further, the operation instructing section 131 acquires an intention of the user on the basis of output of the pressure-sensitive sensor 110, and gives an instruction such that the movable body 100 performs motion. This will be described in detail later.

The motion controller 132 is instructed by the operation instructing section 131 to control the traveling apparatus 120 such that the movable body 100 performs motion. For example, when the destination is indicated by the operation instructing section 131, the motion controller 132 controls the traveling apparatus 120 such that the movable body 100 arrives at the destination. In this case, the motion controller 132 recognizes the inclination of a road surface, the load weight, and the center of gravity on the basis of output of a traveling state recognizing sensor such as a speed detection sensor, and this results in being able to perform movement according to the instruction given by the operation instructing section 131.

Further, the motion controller 132 recognizes the surrounding environment on the basis of output of a safety-confirmation sensor such as a laser scanner, and ensures the safety of a person or the movable body 100. Furthermore, the motion controller 132 can also be used to control the traveling apparatus 120, using a two-way communication with a surrounding vehicle and a signal device.

The movable body 100 has the schematic configuration described above. As described above, when a destination is indicated by the operation instructing section 131, the traveling apparatus 120 is controlled by the motion controller 132, and the movable body 100 moves to the destination.

Here, in some cases, a user wishes to perform an operation regarding the movement of the movable body 100. For example, it is the case of correcting a stop position, or putting a car into a small garage, or taking a car out of a small garage. Further, in some cases, the user also wishes to instruct the movable body 100 to start moving, or wishes to stop the movable body 100 immediately after the movable body 100 starts moving.

In such a case, it is difficult to perform an intuitive operation when an operation regarding the movement of the movable body 100 is performed using, for example, an application of a smartphone, and it is not easy to cause the movable body 100 to move as intended by the user. Here, the use of the pressure-sensitive sensor 110 in the movable body 100 makes it possible to perform an intuitive operation of the movable body 100.

[Specific Configuration of Movable Body]

Figure 4:
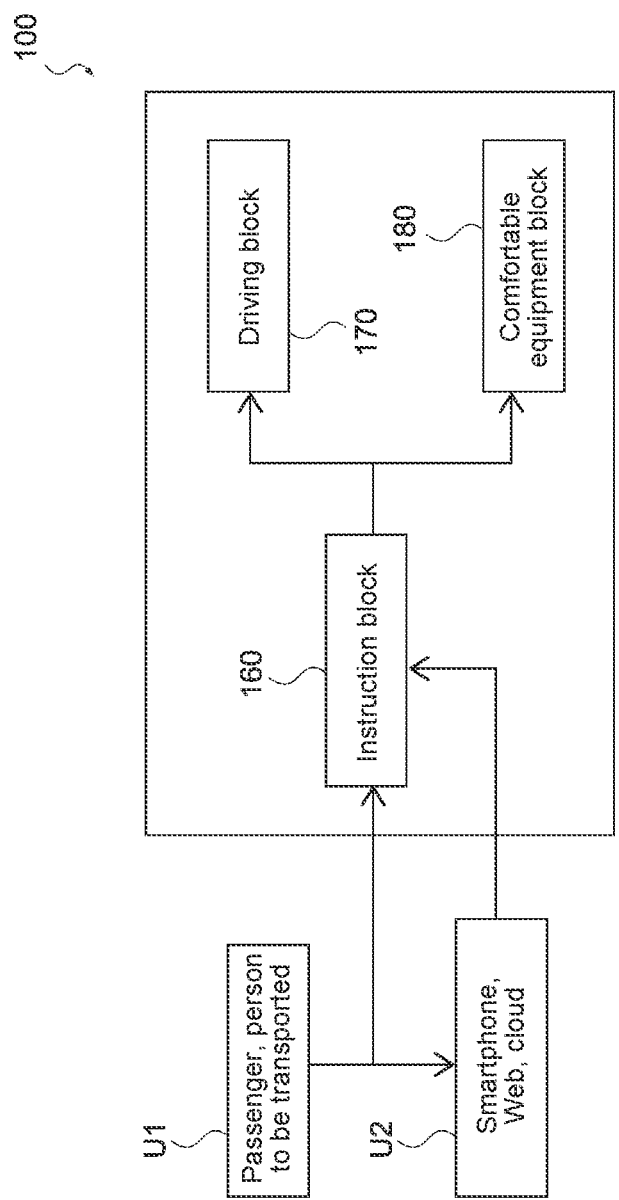
FIG. 4 is a block diagram illustrating a specific configuration of the movable body.

A specific configuration of the movable body 100 is described. FIG. 4 is a block diagram illustrating a specific configuration of the movable body 100. As illustrated in the figure, the movable body 100 includes an instruction block 160, a driving block 170, and a comfortable equipment block 180.

The instruction block 160 provides a UI and receives an input for, for example, designating a destination from a user U1 who is a passenger, a person to be transported, or the like. The instruction block 160 is informed of a designated designation or the like directly by the user U1 when the user U1 is on the movable body 100 or is situated near the movable body 100. Alternatively, when, for example, the user U1 calls the movable body 100, the instruction block 160 is informed of a designated destination or the like by the user U1 through an external information processing apparatus U2 such as a smartphone, the Web, or a cloud.

Figure 5:
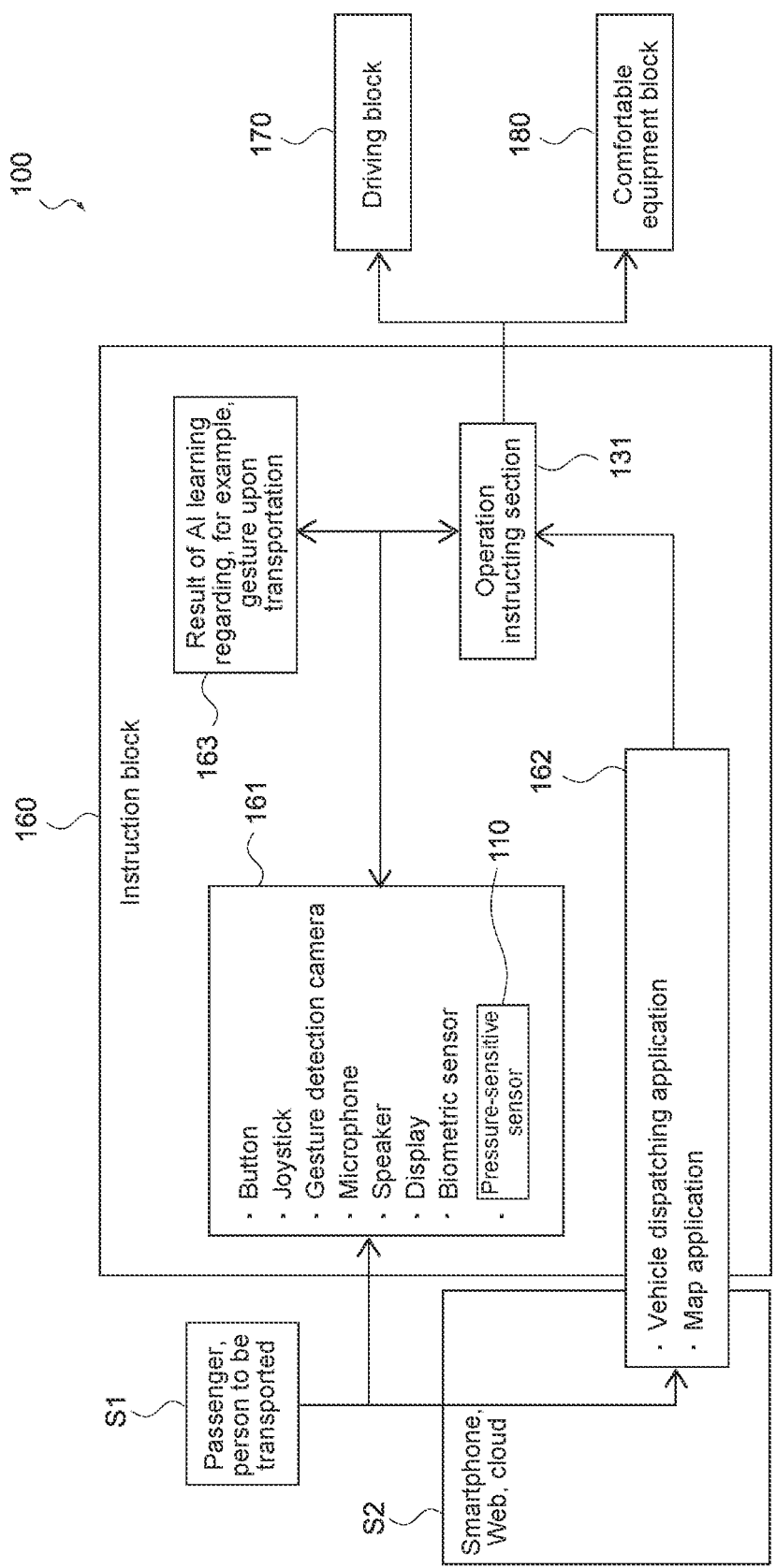
FIG. 5 is a block diagram illustrating a configuration of an instruction block included in the movable body.

FIG. 5 schematically illustrates a configuration of the instruction block 160. As illustrated in the figure, the instruction block 160 includes the operation instructing section 131, a UI input/output section 161, an application information acquiring section 162, and a learning result storage 163.

The UI input/output section 161 includes the pressure-sensitive sensor 110. In addition, the UI input/output section 161 also includes various input/output devices such as a button, a joystick, a gesture detection camera, a microphone, a speaker, a display, and a biometric sensor for, for example, fingerprints. An operation input is performed by the user U1 through the UI input/output section 161.

The application information acquiring section 162 acquires an indication of a destination or the like from the external information processing apparatus U2 through a vehicle dispatching application or a map application, and supplies the indication to the operation instructing section 131. Note that the vehicle dispatching application and the map application may be included in the external information processing apparatus U2 or may be included in the movable body 100.

The learning result storage 163 stores therein a result of artificial intelligence (AI) learning regarding, for example, a gesture of a user upon transportation, and supplies the learning result to the operation instructing section 131.

The operation instructing section 131 controls the UI input/output section 161, the application information acquiring section 162, and the learning result storage 163, and gives an instruction to the motion controller 132 such that the movable body 100 performs motion, as described above. The operation instructing section 131 is implemented by, for example, software and a central processing unit (CPU), a graphics processing unit (GPU), or an AI processor working cooperatively.

Figure 6:
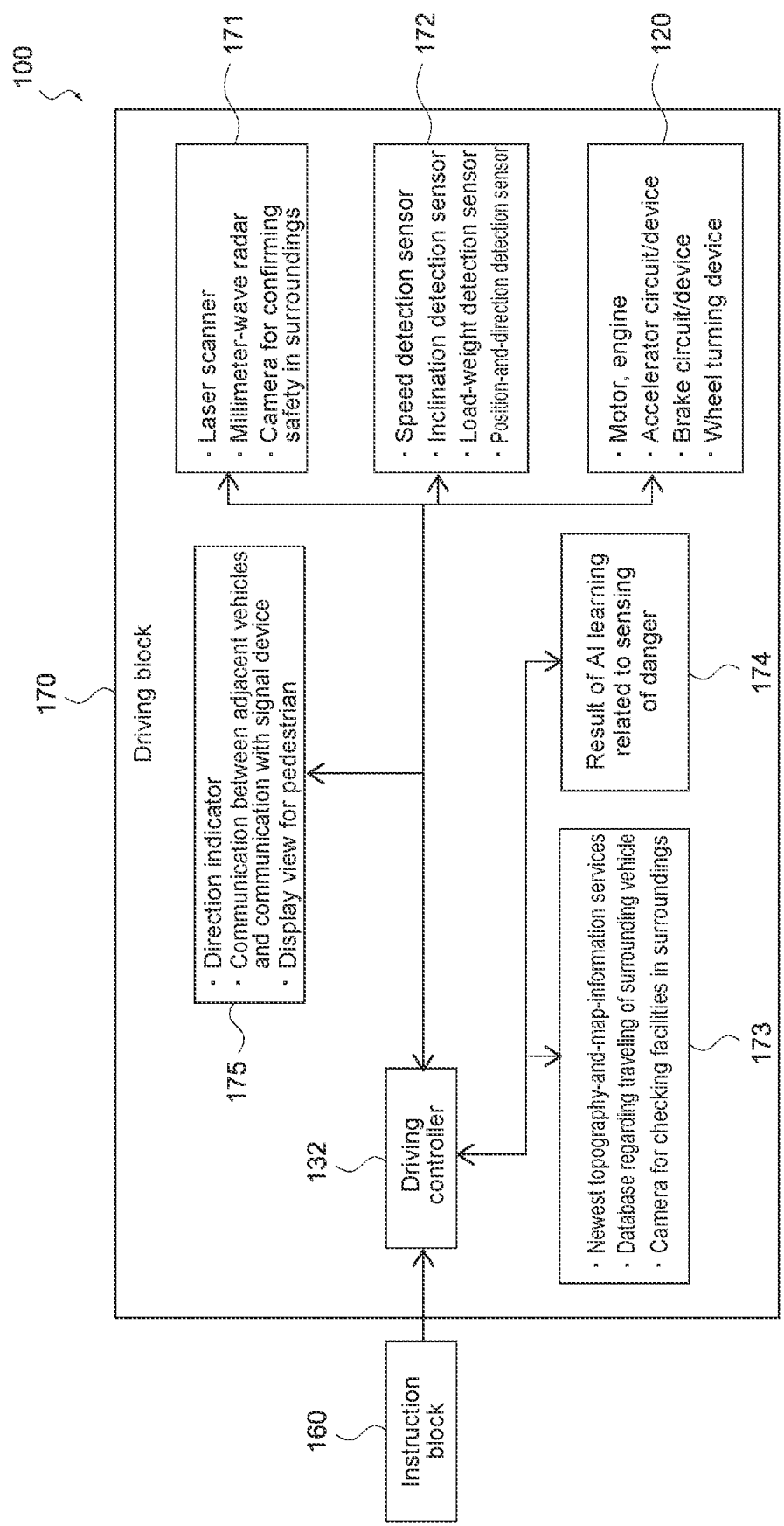
FIG. 6 is a block diagram illustrating a configuration of a driving block included in the movable body.

According to an instruction given by the instruction block 160, the driving block 170 causes the movable body 100 to perform motion. FIG. 6 schematically illustrates a configuration of the driving block 170. As illustrated in the figure, the driving block 170 includes the motion controller 132, the traveling apparatus 120, an external environment detector 171, a traveling state recognizing section 172, an environment information acquiring section 173, a learning result storage 174, and a safe-driving UI section 175.

The external environment detector 171 detects an external environment of the movable body 100. The external environment detector 171 includes various devices, such as a laser scanner, a millimeter-wave radar, and a safety-confirmation camera, that are capable of detecting the external environment of the movable body 100. The external environment detector 171 supplies a result of the detection to the motion controller 132.

The traveling state recognizing section 172 recognizes a traveling state of the movable body 100. The traveling state recognizing section 172 includes various devices, such as a speed detection sensor, an inclination detection sensor, a load-weight detection sensor, and a position-and-direction detection sensor, that are capable of detecting a traveling state of the movable body 100. The traveling state recognizing section 172 supplies a result of the detection to the motion controller 132.

The environment information acquiring section 173 acquires environment information such as map-and-topography information and traffic information. The environment information acquiring section 173 is capable of acquiring environment information from, for example, topography-and-map-information services, a database regarding traveling of a surrounding vehicle, and a camera for checking facilities in the surroundings. The environment information acquiring section 173 supplies the acquired environment information to the motion controller 132.

The learning result storage 174 stores therein a result of AI learning related to sensing of danger, and supplies the learning result to the motion controller 132.

The safe-driving UI section 175 includes a direction indicator, a device used to perform communication between vehicles and communication with a signal device, and a UI input/output device related to safe driving such as a display for pedestrian.

The traveling apparatus 120 is an apparatus used to cause the movable body 100 to travel, and includes various devices, such as a power source such as a motor or an engine, an accelerator circuit/device, a brake circuit/device, and a wheel turning device, that are used to cause the movable body 100 to travel.

The motion controller 132 is instructed by the operation instructing section 131 to control the traveling apparatus 120. The motion controller 132 acquires various information supplied by the external environment detector 171, the traveling state recognizing section 172, the environment information acquiring section 173, and the learning result storage 174, and controls the traveling apparatus 120 according to the instruction given by the operation instructing section 131, such that the movable body 100 performs motion.

Further, the motion controller 132 acquires information from the safe-driving UI section 175 as necessary, or causes the safe-driving UI section 175 to present the information. The motion controller 132 is implemented by, for example, software and a CPU, a GPU, or an AI processor working cooperatively.

The comfortable equipment block 180 includes various devices such as a mechanism for adjusting a position and a tilt of a seat, a mechanism for adjusting a seat temperature, air conditioning, and audio, and is instructed by the instruction block 160 to operate the various devices.

The operation instructing section 131 and the motion controller 132 may be implemented by an information processing apparatus included in the movable body 100. Note that the operation instructing section 131 and the motion controller 132 may be implemented by a plurality of information processing apparatuses physically spaced from each other. Further, a structural element may be shared by the instruction block 160, the driving block 170, and the comfortable equipment block 180.

FIG. 7 is a table used to compare roles of the instruction block 160 and the driving block 170 of the movable body 100, and roles played in a general automobile (such as a taxi and a sightseeing bus) that is not an autonomous vehicle. As illustrated in the figure, the role of instruction block 160 corresponds to roles played by, for example, a taxi dispatching application, a conductor of a sightseeing bus, and a car navigation in a general automobile. Further, the role of the driving block 170 corresponds to a role played by a driver in a general automobile.

Figure 8:
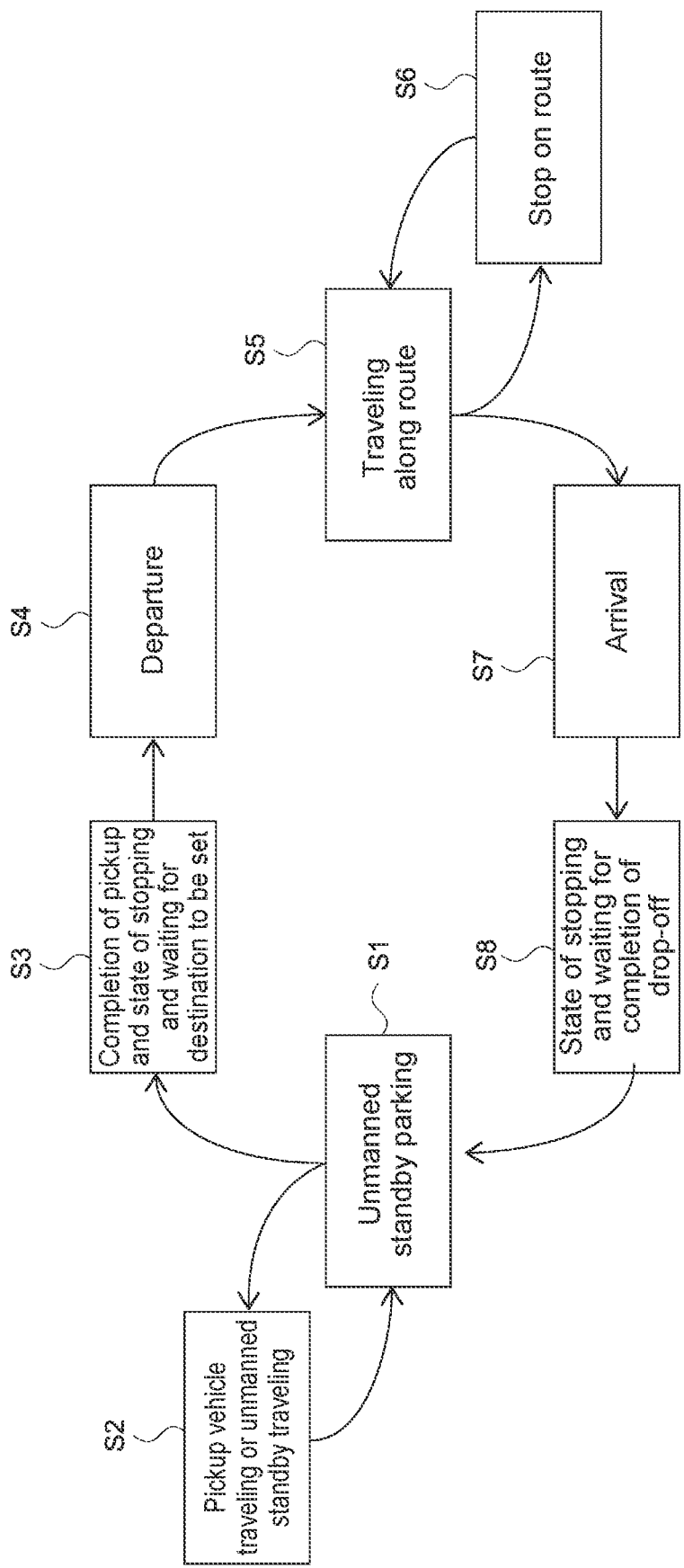
FIG. 8 illustrates an example of a change in a state of the movable body.

FIG. 8 illustrates an example of a change in a state of the movable body 100. As illustrated in the figure, the state of the movable body 100 is changed between states including un unmanned standby state (S1), pickup vehicle traveling or unmanned standby traveling (S2), completion of pickup and a state of stopping and waiting for a destination to be set (S3), departure (S4), traveling along a route (S5), a stop on the route (S6), arrival (S7), and a state of stopping and waiting for completion of drop-off (S8). In the movable body 100, the instruction block 160 and the driving block 170 operate to provide the respective states illustrated in FIG. 8.

Figure 9:
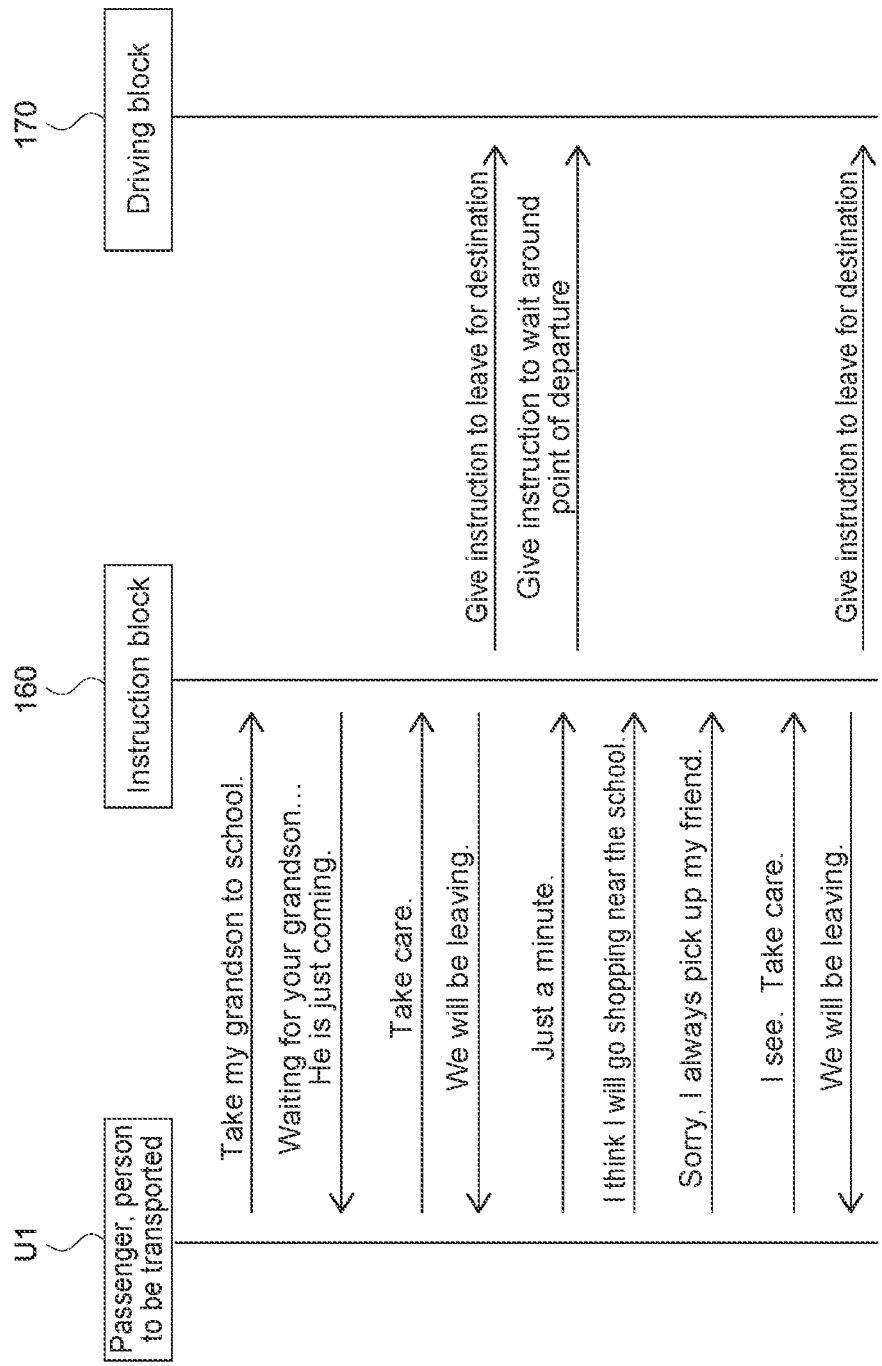
FIG. 9 is a sequence diagram of blocks of the movable body.

FIG. 9 is a sequence diagram of the blocks of the movable body 100. As illustrated in the figure, the user U1 gives an instruction to the instruction block 160 using sound or the like, and the instruction block 160 responds to the instruction using, for example, sound or display. In this case, in addition to, or instead of sound, the user U1 may use visual or tactile sensation by use of a gesture to give an instruction using the pressure-sensitive sensor 110. The instruction block 160 generates an instruction to the driving block 170 in response to the instruction given by the user U1, and supplies the generated instruction to the driving block 170.

The movable body 100 may have the specific configuration described above. Note that the configuration described above is an example of the configuration of the movable body 100, and it is sufficient if the movable body 100 has a schematic configuration as illustrated in FIG. 1.

[Regarding Operation Performed Using Pressure-Sensitive Sensor]

An operation of the movable body 100 that is performed using the pressure-sensitive sensor 110 is described. Using the pressure-sensitive sensor 110, a user can instruct the movable body 100 to perform various motions.

For example, when the user presses the detection surface 111 in a traveling direction of the movable body 100 while the movable body 100 is stopped, the operation instructing section 131 can give an instruction to the motion controller 132 on the basis of pressure or a shearing force that is detected by the pressure-sensitive sensor 110, such that the movable body 100 starts moving. The motion controller 132 controls the traveling apparatus 120 according to the instruction given by the operation instructing section 131, and causes the movable body 100 to start moving. The operation instructing section 131 may adjust the acceleration of the movable body 100 according to a pressing force of the pressure-sensitive sensor 110.

Further, when the user presses the detection surface 111 in a direction opposite to the traveling direction of the movable body 100 while the movable body 100 is moving, the operation instructing section 131 can gives an instruction to the motion controller 132 on the basis of pressure or a shearing force that is detected by the pressure-sensitive sensor 110, such that the movable body 100 is stopped. The motion controller 132 controls the traveling apparatus 120 according to the instruction given by the operation instructing section 131, and causes the movable body 100 to be stopped. The operation instructing section 131 may adjust the acceleration (deceleration) of the movable body 100 according to a pressing force of the pressure-sensitive sensor 110.

Furthermore, when the user wishes to correct a stop position of the movable body 100, the user presses the pressure-sensitive sensor 110 in a direction in which the user wishes to move the movable body 100. When pressure or a shearing force is detected by the pressure-sensitive sensor 110, the operation instructing section 131 gives an instruction to the motion controller 132 during detection of the pressure or the shearing force, such that the movable body 100 moves in a direction in which the pressure or the shearing force is being applied.

The motion controller 132 controls the traveling apparatus 120 according to the instruction given by the operation instructing section 131, and causes the movable body 100 to move in the direction in which the pressure or the shearing force is being applied. The operation instructing section 131 may adjust a movement speed of the movable body 100 according to the pressing force of the pressure-sensitive sensor 110.

Further, when the detection surface 111 is pressed, the operation instructing section 131 can determine the type of pressing object and the number of pressing objects on the basis of a pressure distribution. Examples of the pressing object include the finger, the palm of the hand, and the foot of the user. For example, the operation instructing section 131 can determine the type of pressing object and the number of pressing objects using the pressing area.

The operation instructing section 131 can give an instruction regarding motion to the motion controller 132 according to the type of pressing object or the number of pressing objects. For example, when the pressing object is a certain number of fingers or more, or the palm of the hand, the operation instructing section 131 can give an instruction regarding motion to the motion controller 132 according to output of the pressure-sensitive sensor 110. Further, when the pressing object is fewer than the certain number of fingers, the operation instructing section 131 understands that an instruction regarding movement is not given, and can determine that an instruction regarding motion is not to be given to the motion controller 132 according to output of the pressure-sensitive sensors 110.

Figure 10:
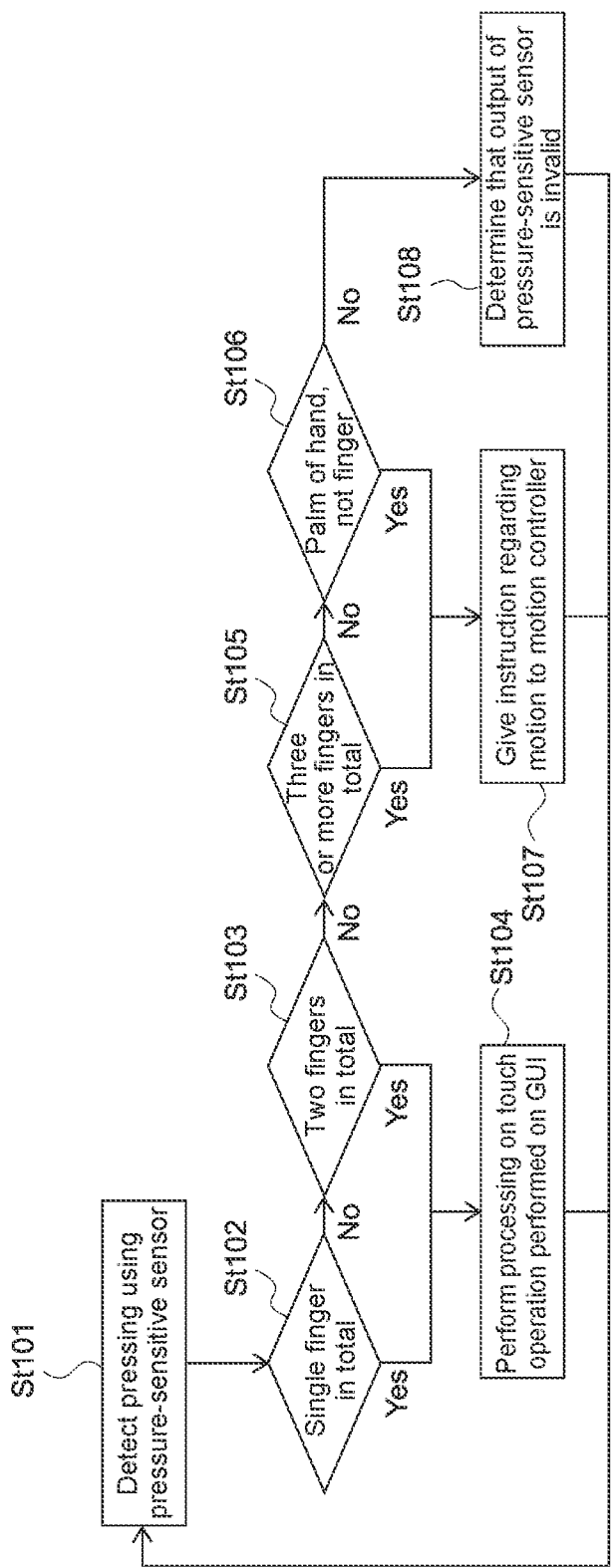
FIG. 10 is a flowchart illustrating an example of the behavior of the movable body depending on the type of pressing object and the number of pressing objects.

FIG. 10 is a flowchart illustrating an example of the behavior of the movable body 100 depending on the type of pressing object and the number of pressing objects. The pressure-sensitive sensor 110 can also be used as a graphical user interface (GUI) operation panel that makes it possible to display an image on the detection surface 111. In this case, there is a need to distinguish between a touch operation performed on the GUI and a movement instruction to the movable body 100. Here, the operation instructing section 131 can distinguish between a touch operation performed on the GUI and a movement instruction to the movable body 100 according to the number of pressing points, on the detection surface 111, at which the detection surface 111 is pressed, or the pressing area of a pressed portion of the detection surface 111.

As illustrated in FIG. 10, when the operation instructing section 131 detects that the detection surface 111 has is pressed (St101), the operation instructing section 131 determines whether a touch is performed with a single finger in total (St102). Note that the operation instructing section 131 can determine the pressing area from a distribution of pressure applied to the pressure-sensitive sensor 110 and determine that the pressing is performed with a single finger.

When the detection surface 111 is not pressed with a single finger (St102: No), the operation instructing section 131 determines whether the pressing is performed with two fingers in total from the distribution of pressure applied to the pressure-sensitive sensor 110 (St103).

When the pressing is performed with a single finger or two fingers in total (St102, St103: Yes), the operation instructing section 131 determines that a touch operation is performed on the GUI, and performs processing on an operation input according to the touch operation (St104).

Further, when the pressing is not performed with two fingers in total (St103: No), the operation instructing section 131 determines whether the pressing is performed with three or more fingers in total (St105). When the pressing is not performed with three or more fingers (St105: No), the operation instructing section 131 determines whether the pressing is performed with the palm of the hand from the distribution of pressure applied to the pressure-sensitive sensor 110 (St106).

When the pressing is performed with three or more fingers in total or with the palm of the hand (St105, St106: Yes), the operation instructing section 131 determines that an instruction regarding the movement of the movable body 100 is given, and gives an instruction to the motion controller 132 according to the operation such that the movable body performs motion (St107). Note that the operation instructing section 131 may give different instructions to the motion controller 132 when the pressing is performed with three fingers and when the pressing is performed with the palm of the hand.

Further, when the pressing is not performed with the palm of the hand (St106: No), the operation instructing section 131 determines that the output performed by the pressure-sensitive sensor 110 is invalid (St108). Such determination is performed in order to not reflect, in the movement of the movable body 100, an unintended operation performed by the user, such as a case in which the user leans against the movable body 100. In this case, for example, a stop state is maintained when the movable body 100 is stopped.

Further, according to an angle formed by a movement direction of the movable body 100 and the detection surface 111, the operation instructing section 131 can select a force used to give an instruction to the motion controller 132 from pressure and a shearing force that are detected by the pressure-sensitive sensor 110.

In some cases, the detection surface 111 is arranged orthogonal to the movement direction of the movable body 100 (a front-rear direction and a left-right direction), that is, in a vertical plane (for example, on the side surface of a vehicle). In some cases, the detection surface 111 is arranged orthogonal to a direction (an up-down direction) in which the movable body 100 is unable to move, that is, in a horizontal plane (for example, on a hood of a vehicle). Thus, the operation instructing section 131 can use output of the pressure-sensitive sensor 110 according to the angle of the detection surface 111.

The operation instructing section 131 can use a shearing force to give an instruction to the motion controller 132 when the detection surface 111 is parallel to the movement direction. Further, when the detection surface 111 is orthogonal to the movement direction, the operation instructing section 131 can use pressure and a shearing force to give an instruction to the motion controller 132, the shearing force being a shearing force in a direction parallel to the movement direction.

Figure 11:
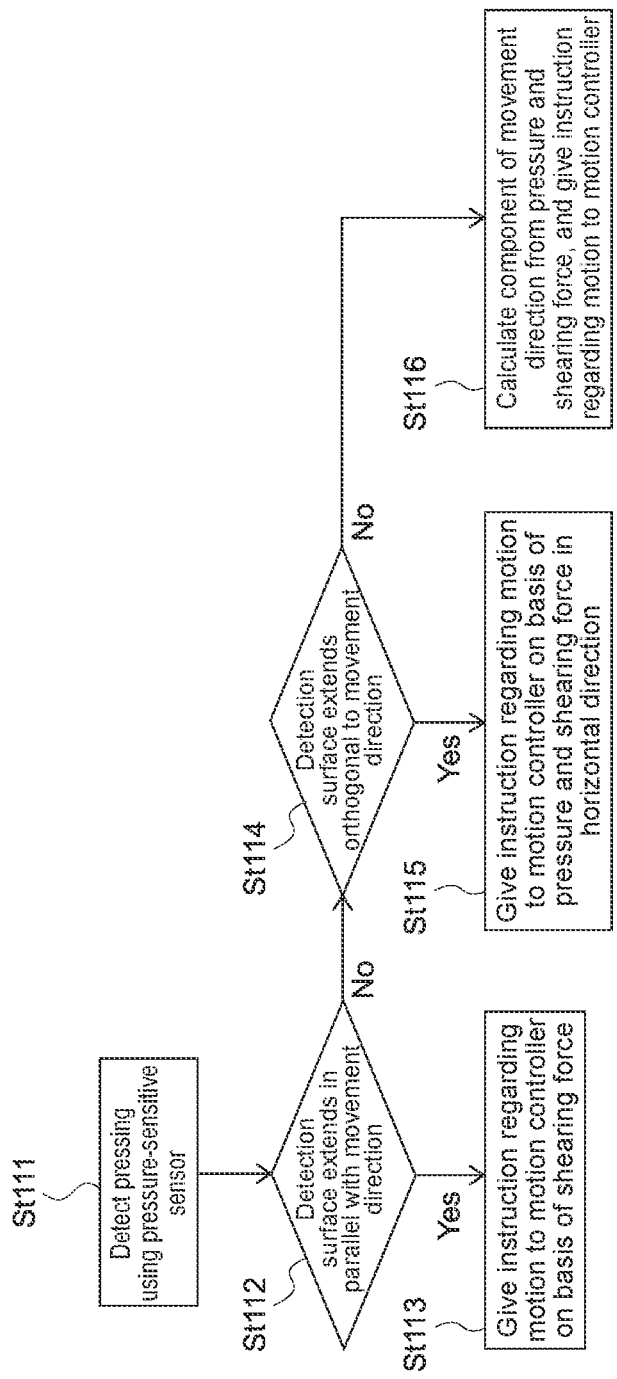
FIG. 11 is a flowchart illustrating an example of the behavior of the movable body depending on an angle formed by a movement direction of the movable body and the detection surface.

FIG. 11 is a flowchart illustrating an example of the behavior of the movable body 100 depending on an angle formed by a movement direction of the movable body 100 and the detection surface 111. As illustrated in FIG. 11, when the operation instructing section 131 detects that the detection surface 111 is pressed (St11), the operation instructing section 131 determines whether the pressed detection surface 111 is a surface extending in parallel with the movement direction (St112).

When the pressed detection surface 111 is the surface extending in parallel with the movement direction (such as the horizontal plane) (St112: Yes), the operation instructing section 131 gives an instruction to the motion controller 132 on the basis of a shearing force from among output of the pressure-sensitive sensor 110 (St113). On the other hand, the operation instructing section 131 does not use pressure from among the output of the pressure-sensitive sensor 110. The reason is that the direction of the shearing force corresponds to the movement direction of the movable body 100, and the direction of the pressure (a vertical direction) does not correspond to the movement direction of the movable body 100.

Further, when the pressed detection surface 111 is not the surface extending in parallel with the movement direction (St112: No), the operation instructing section 131 determines whether the pressed detection surface 111 is a surface extending orthogonal to the movement direction (such as the vertical plane) (St114).

When the pressed detection surface 111 is the surface extending orthogonal to the movement direction (St114: Yes), the operation instructing section 131 gives an instruction to the motion controller 132 on the basis of pressure and a shearing force in a horizontal direction from among the output of the pressure-sensitive sensor 110 (St115). On the other hand, the operation instructing section 131 does not use a shearing force in the vertical direction from among the output of the pressure-sensitive sensor 110. The reason is that the shearing force in the vertical direction does not correspond to the movement direction of the movable body 100.

Further, when the pressed detection surface 111 is not the surface extending orthogonal to the movement direction (St114: No), the operation instructing section 131 calculates a component of the movement direction of the movable body 100 from the pressure and the shearing force from among the output of the pressure-sensitive sensor 110, and gives an instruction to the motion controller 132 on the basis of the calculated component (St116).

Accordingly, for example, when the movable body 100 is an automobile, a user can move the automobile by bring his/her hand into contact with a hood and applying a force (a shearing force) in a direction parallel to the hood. Further, the user can also move the automobile by bring his/her hand into contact with a side surface of the automobile and applying a force (pressure) in a direction orthogonal to the side surface.

Note that, when the movable body 100 primarily moves in the front-rear direction, the operation instructing section 131 does not use pressure and a shearing force for the left-right direction and the up-down direction. Further, the detection surface 111 is not limited to a planar surface, and may be a curved surface. In this case, the operation instructing section 131 can perform the processing described above on the basis of a relationship between a position in which pressing has been detected, and a movement direction of the movable body 100.

Further, the operation instructing section 131 can also give different instructions to the motion controller 132 depending on the number of hands pressed against the detection surface 111. For example, when the operation instructing section 131 has determined, from a distribution of pressure applied to the detection surface 111, that a single hand is pressed against the detection surface 111, the operation instructing section 131 can give an instruction to the motion controller 132 such that the movable body 100 moves while suppressing a turn of the movable body 100.

Further, when the operation instructing section 131 has determined that a plurality of hands is pressed against the detection surface 111, the operation instructing section 131 can give an instruction to the motion controller 132 such that the movable body 100 moves with a turn. This makes it possible to perform different methods for moving the movable body 100 when the movable body 100 is moved by a single person and when the movable body 100 is moved by multiple people.

Figure 12:
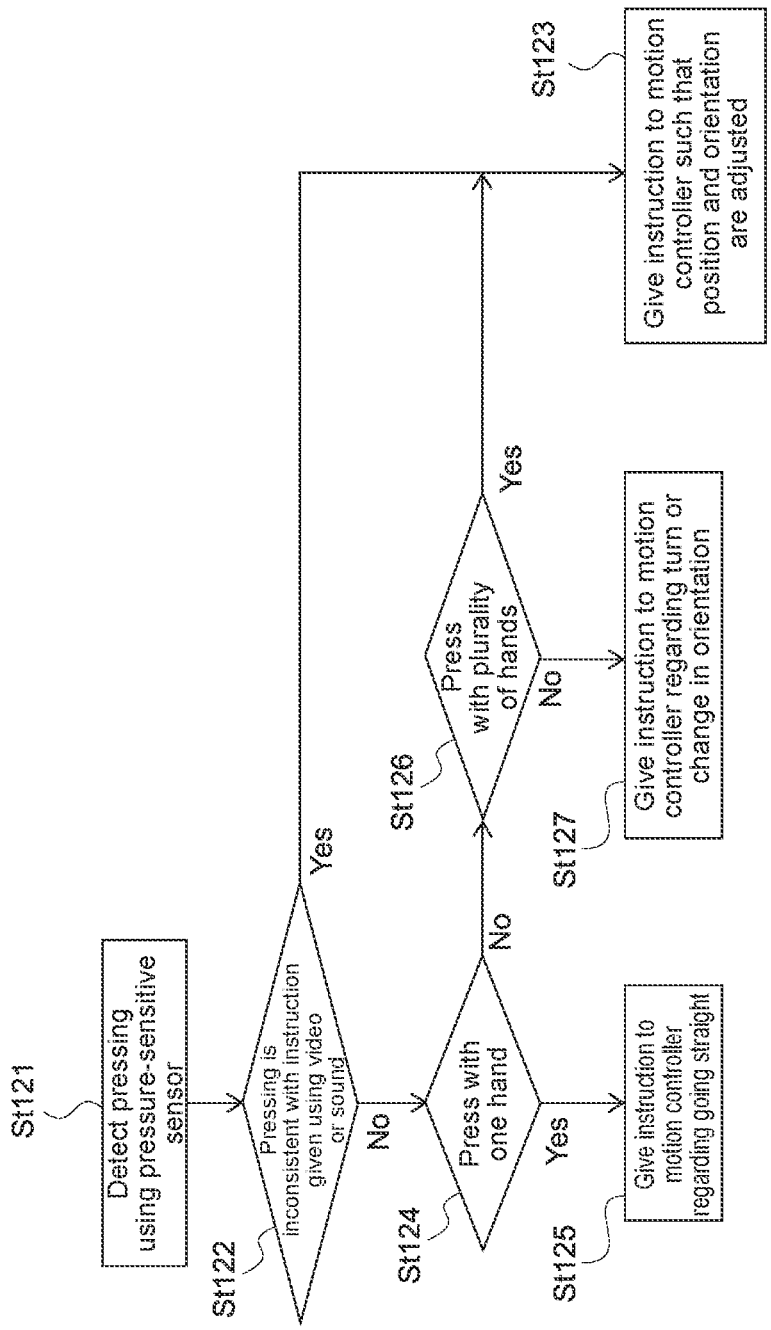
FIG. 12 is a flowchart illustrating an example of the behavior of the movable body depending on the number of pressing points, on the detection surface, at which the detection surface is pressed.

FIG. 12 is a flowchart illustrating an example of the behavior of the movable body 100 depending on the number of pressing points, on the detection surface 111, at which the detection surface 111 is pressed. When the position of the movable body 100 is corrected, the operation instructing section 131 can switch the method for moving the movable body 100 according to number of pressing points, on the detection surface 111, at which the detection surface 111 is pressed.

As illustrated in FIG. 12, when the operation instructing section 131 detects that the detection surface 111 is pressed (St121), the operation instructing section 131 determines whether the pressing is inconsistent with an instruction given using video or sound (St122). When the pressing is inconsistent with the instruction given using video or sound (St122: Yes), the operation instructing section 131 gives an instruction to the motion controller 132 on the basis of pressure and a shearing force that are output from the pressure-sensitive sensor 110, such that the position and the orientation of the movable body 100 are adjusted (St123).

When the pressing is not inconsistent with the instruction given using video or sound (St122: No), the operation instructing section 131 determines whether a user is pressing the detection surface 111 with one hand (St124). From the pressing area and a distance between the pressing points, the operation instructing section 131 can determine whether the user is pressing the detection surface 111 with one hand.

When the user is pressing the detection surface 111 with one hand (St124: Yes), the operation instructing section 131 gives an instruction to the motion controller 132 such that the movable body 100 goes straight without a change in orientation (St125). Further, when the user is not pressing the detection surface 111 with one hand (St124: No), the operation instructing section 131 determines whether the detection surface 111 is pressed with a plurality of hands in directions in which the respective pressings cancel each other or in opposite directions (St126).

When the detection surface 111 is pressed with the plurality of hands in the directions in which the respective pressings cancel each other or in the opposite directions (St126: Yes), the operation instructing section 131 gives an instruction to the motion controller 132 on the basis of pressure and a shearing force that are output from the pressure-sensitive sensor 110, such that the position or the orientation of the movable body 100 is adjusted (St123).

Further, when the detection surface 111 is not pressed with the plurality of hands in the directions in which the respective pressings cancel each other or in the opposite directions (St126: No), the operation instructing section 131 gives an instruction to the motion controller 132 such that the movable body 100 moves with a turn or a change in orientation (St127).

Accordingly, the user can cause the movable body 100 to go straight by pressing the movable body 100 with one hand, and can turn the movable body 100 or change the orientation of the movable body 100 by pressing the movable body 100 with both hands. Further, a plurality of users can cooperatively adjust the position of the movable body 100 by pressing the movable body 100, for example, in the front of and in the rear of the movable body 100.

Further, the operation instructing section 131 can give an instruction to the motion controller 132 according to an operational state of the movable body 100 in autonomous driving. For example, when the user presses the pressure-sensitive sensor 110 in a state in which a destination of the movable body 100 has been set, the operation instructing section 131 determines that the pressing indicates a signal of permission for departure, and can give an instruction to the motion controller 132 such that the movable body 100 moves toward the destination.

Further, when the user presses the pressure-sensitive sensor 110 immediately after the movable body 100 starts moving, the operation instructing section 131 determines that the pressing indicates a signal to stop the start of movement, and can give an instruction to the motion controller 132 such that the movable body 100 is stopped. Furthermore, when the user presses the pressure-sensitive sensor 110 near the destination, the movable body 100 determines that the pressing indicates an indication of a stop position of the movable body 100, and can give an instruction to the motion controller 132 such that the movable body 100 is stopped.

Figure 13:
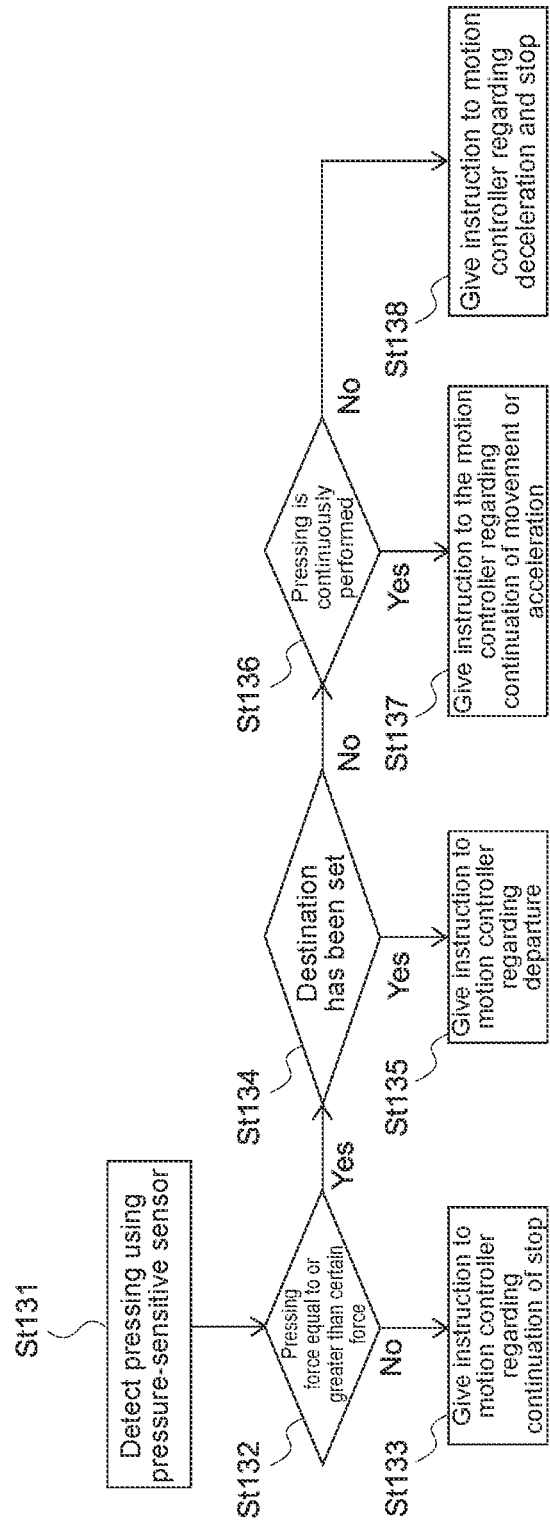
FIG. 13 is a flowchart illustrating an example of the behavior of the movable body depending on an operational state in autonomous driving.

FIG. 13 is a flowchart illustrating an example of the behavior of the movable body 100 depending on an operational state in autonomous driving. When the movable body 100 is stopped, the operation instructing section 131 can control start of the movement of the movable body 100 using a pressing force applied to the detection surface 111. As illustrated in FIG. 13, when the operation instructing section 131 detects that the detection surface 111 is pressed (St131), the operation instructing section 131 determines whether the pressing force exhibits a value equal to or greater than a certain value (St132).

When the pressing force exhibits a value less than the certain value (St132: No), the operation instructing section 131 gives an instruction to the motion controller 132 such that the movable body 100 is continuously stopped (St133). On the other hand, when the pressing force exhibits a value equal to or greater than the certain value (St132: Yes), the operation instructing section 131 determines whether a destination of the movable body 100 has been set (St134).

When the destination has been set (St134: Yes), the operation instructing section 131 gives an instruction to the motion controller 132 such that the movable body 100 starts moving toward the destination (St135). Further, when the destination has not been set (St134: No), the operation instructing section 131 causes the movable body 100 to start moving, and determines whether the pressing is continuously performed (St136).

When the pressing is continuously performed (St136: Yes), the operation instructing section 131 gives an instruction to the motion controller 132 such that the movable body 100 continues to move or to be accelerated (St137). When the pressing is not continuously performed (St136: No), the operation instructing section 131 gives an instruction to the motion controller 132 such that the movable body 100 is decelerated to be stopped (St138).

Accordingly, the user can move the movable body 100 by pressing the detection surface 111 with a pressing force equal to or greater than a certain degree of pressing force. This enables the movable body 100 to cause the user to feel a virtual load. This processing causes the user to feel a virtual load on a UI, regardless of the inclination of a road surface and the weight of the movable body 100. Accordingly, the user who is pressing the detection surface 111 can feel like he/she is actually moving the movable body 100 by performing pressing. It is possible to perform adjustment such that the pressing force necessary to cause the movable body 100 to start moving is made weaker when the user seems to have less strength. Further, this processing can be interpreted as an instruction regarding departure to a destination of the movable body 100 when the destination has been set.

For example, when the movable body 100 is moved, the operation instructing section 131 can give an instruction to the motion controller 132 such that there exists friction due to a virtual horizontal plane and lightness in weight, regardless of the weight of the movable body 100 including a loaded object and the inclination of a road surface. Further, when the movable body 100 is turned, the operation instructing section 131 can give an instruction to the motion controller 132 such that the movable body 100 is turned with a virtual lightness in weight or with the center of gravity coinciding an apparent center, regardless of the center of gravity of the movable body 100 including the loaded object.

The operation instructing section 131 can also identify a user who is pressing the detection surface 111 and give an instruction to the motion controller 132 according to a result of the identification. The operation instructing section 131 can identify individuals by communicating with a near-field-communication unlocking device or a wearable device of the user. Further, the operation instructing section 131 can also identify individuals using characteristics of a living body such as characteristics of a face, an iris, a fingerprint, a vein, voice, or a distribution of pressure with respect to a hand. Furthermore, the operation instructing section 131 can also perform a personal authentication using, for example, a sign given to the outside of a vehicle body of the movable body 100 or a window of the movable body 100, a password created using the order of applying pressure with a finger, or a line-of-sight gesture.

According to a result of the identification, the operation instructing section 131 sets a pressing force necessary to move the movable body 100, and when the pressing force exhibits a value greater than a set value, the operation instructing section 131 can give an instruction regarding motion to the motion controller 132 on the basis of output of the pressure-sensitive sensor 110. Accordingly, for example, the user having less strength can move the movable body 100 with a weak pressing force.

Further, the operation instructing section 131 can give an instruction to the motion controller 132 following the contact and the movement of the hand pressed against the detection surface 111, such that a movement amount of the hand and a movement amount of the movable body 100 are equal.

Furthermore, when the detection surface 111 is pressed with a pressing object while the movable body 100 is moving, the operation instructing section 131 can give an instruction to the motion controller 132 such that the movable body 100 moves while keeping in contact with the pressing object.

Figure 14:
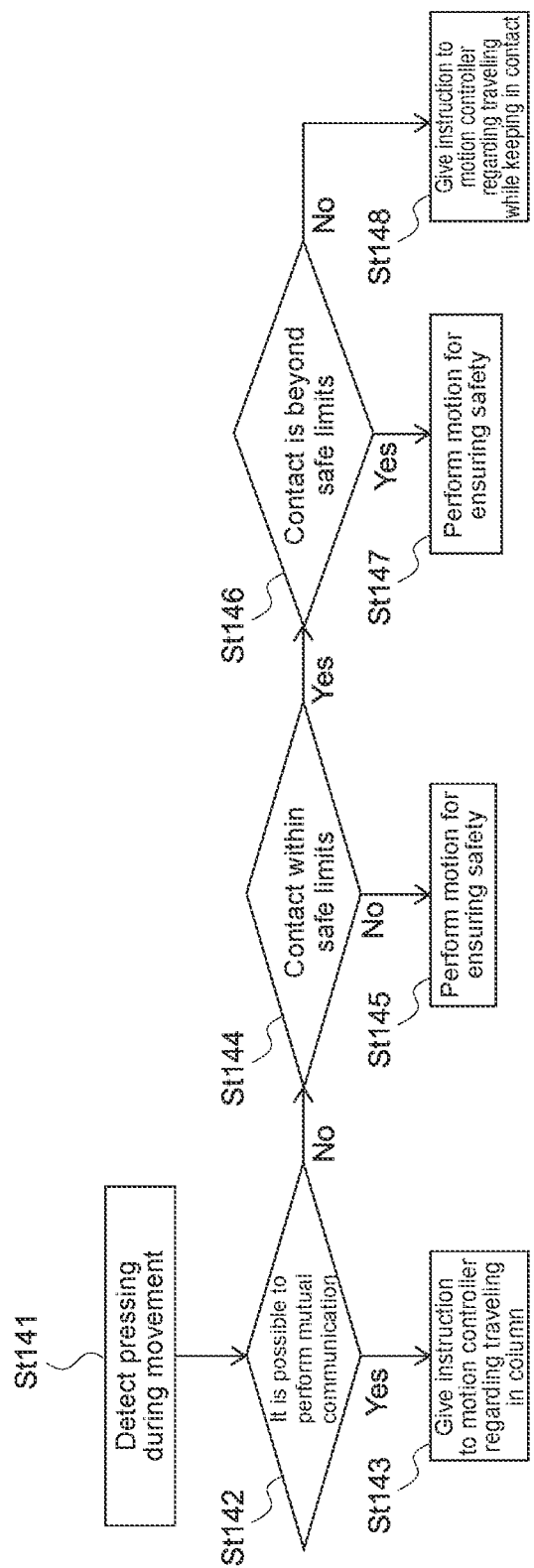
FIG. 14 is a flowchart illustrating an example of the behavior of the movable body with respect to side-by-side traveling and guiding.

FIG. 14 is a flowchart illustrating an example of the behavior of the movable body 100 with respect to side-by-side traveling and guiding. When a person who is riding a robot car or a bicycle presses the detection surface 111 while the movable body 100, the operation instructing section 131 can control motion of the movable body 100 according to a contacting object and the environment. As illustrated in FIG. 14, when the operation instructing section 131 detects that the detection surface 111 is pressed while the movable body 100 is moving at a speed equal to or greater than a certain speed (St141), the operation instructing section 131 determines whether it is possible to perform mutual communication with the contacting object (St142).

When it is possible to perform the mutual communication with the contacting object (St142: Yes), the operation instructing section 131 gives an instruction to the motion controller 132 such that the movable body 100 performs mutual communication with the contacting object and travels with the contacting object in a column (St143). When it is not possible to perform the mutual communication with the contacting object (St142: No), the operation instructing section 131 notifies the motion controller 132 of the matter.

The motion controller 132 determines whether the contact is within safe limits (St144). The motion controller 132 can determine whether the contact is within safe limits according to, for example, the speed of the movable body 100 or the surrounding environment. When the motion controller 132 determines that the contact is not within safe limits (St144: No), the motion controller 132 causes a motion for ensuring safety to be performed (St145). Examples of the motion for ensuring safety include deceleration and having a distance from the contacting object.

When the motion controller 132 has determined that the contact is within safe limits (St144: Yes), the operation instructing section 131 gives an instruction to the motion controller 132 such that the movable body 100 moves while keeping in contact with the contacting object. Further, the motion controller 132 determines whether the contact is beyond safe limits due to the subsequent motion such as acceleration or deceleration.

When the contact is beyond safe limits (St146: Yes), the motion controller 132 causes the motion for ensuring safety, such as cancelation of the contact with the contacting target, to be performed (St147). When the motion controller 132 has determined that the contact is not beyond safe limits (St146: No), the operation instructing section 131 gives an instruction to the motion controller 132 such that the movable body 100 continues to move while keeping in contact with the contacting target (St148).

Accordingly, the movable body 100 can travel safely while keeping in contact with an adjacent vehicle or person due to a certain pressure being applied. Consequently, for example, the movable body 100 can travel while understanding an intention of an object that is traveling side by side, a bicycle rider can be pulled by the movable body 100 by putting the hand on the movable body 100 or holding the movable body 100, and automobiles can efficiently travel in a column by coming into slight contact with each other.

Figure 15:
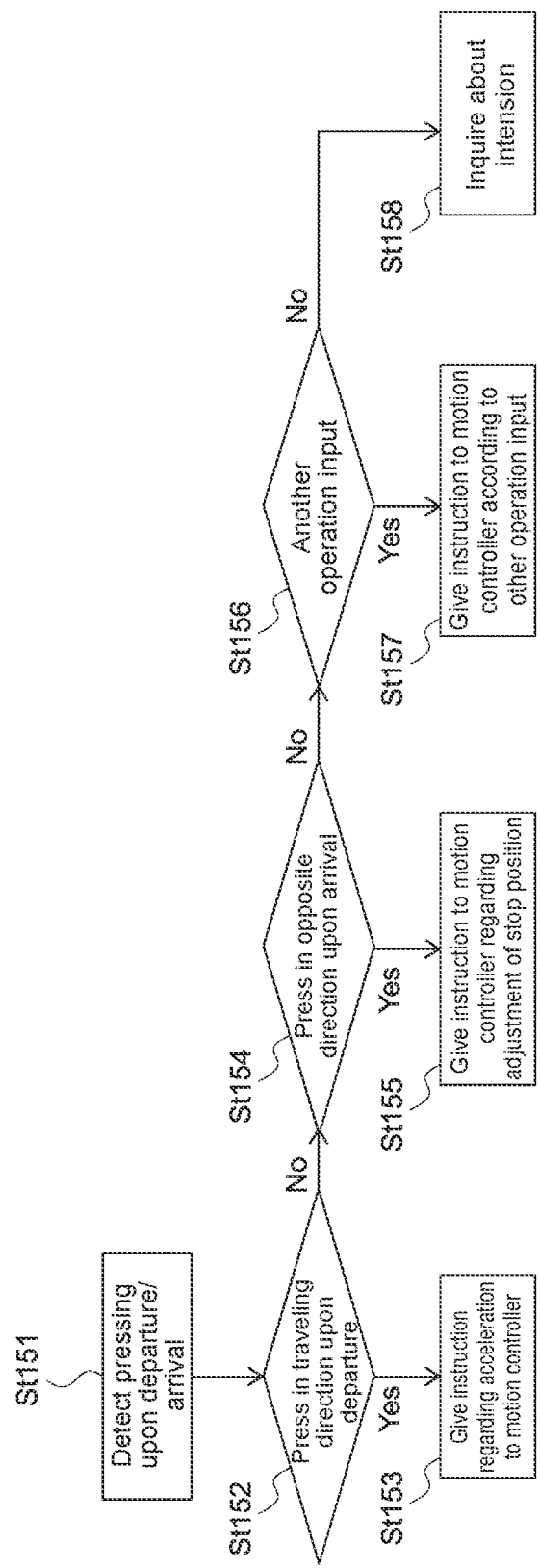
FIG. 15 is a flowchart illustrating an example of the behavior of the movable body with respect to acceleration and deceleration.

FIG. 15 is a flowchart illustrating an example of the behavior of the movable body 100 with respect to acceleration and deceleration. The operation instructing section 131 can control the movement of the movable body 100 using output of the pressure-sensitive sensor 110 when the movable body 100 leaves for a destination or arrives at the destination.

As illustrated in FIG. 15, when the operation instructing section 131 detects that the detection surface 111 is pressed upon departure or arrival (St151), the operation instructing section 131 determines whether the detection surface 111 is pressed in a traveling direction of the movable body 100 upon departure (St152). When the detection surface 111 is pressed in the traveling direction upon departure (St152:

Yes), the operation instructing section 131 gives an instruction to the motion controller 132 such that the movable body 100 is accelerated (St153).

Further, the operation instructing section 131 determines whether the detection surface 111 is pressed in a direction opposite to the traveling direction of the movable body 100 upon arrival (St154). When the detection surface 111 is pressed in the direction opposite to the traveling direction upon arrival (St154: Yes), the operation instructing section 131 gives an instruction to the motion controller 132 such that a stop position of the movable body 100 is adjusted (St155).

When the detection surface 111 is not pressed in the direction opposite to the traveling direction upon arrival (St154: No), the operation instructing section 131 determines whether another operation input is performed (St156). A gesture using a body or sound is an example of the other operation input.

When the other operation input is performed (St156: Yes), the operation instructing section 131 instructs the motion controller 132 to control the movement of the movable body 100 according to the operation input (St157). When the other operation input is not performed (St156: No), the operation instructing section 131 inquires of the user about his/her intention of pressing the detection surface 111 (St158).

The pressing of the detection surface 111 in a state in which the movable body 100 is not completely stopped upon departure and arrival can be variously interpreted. However, the processing described above makes it possible to control the motion of the movable body 100 according to reminders such as encouraging of a start of movement upon departure, an indication of a stop position, or other reminders.

As described above, in the movable body 100, it is possible to perform an intuitive operation of pressing the movable body 100 in an arbitrary direction, using the pressure-sensitive sensor 110.

[Configuration of Pressure-Sensitive Sensor]

As described above, the pressure-sensitive sensor 110 detects at least a distribution of pressure applied to the detection surface 111 (refer to FIG. 2), that is, a distribution of pressure applied in the Z-direction, the distribution of pressure being a distribution on the detection surface 111 (in the XY-plane). Further, it is favorable that the pressure-sensitive sensor 110 be capable of detecting a shearing force with respect to the detection surface 111, that is, a friction force applied to the detection surface 111 in the X-direction and in the Y-direction.

<First Structure of Pressure-Sensitive Sensor>

Figure 16:
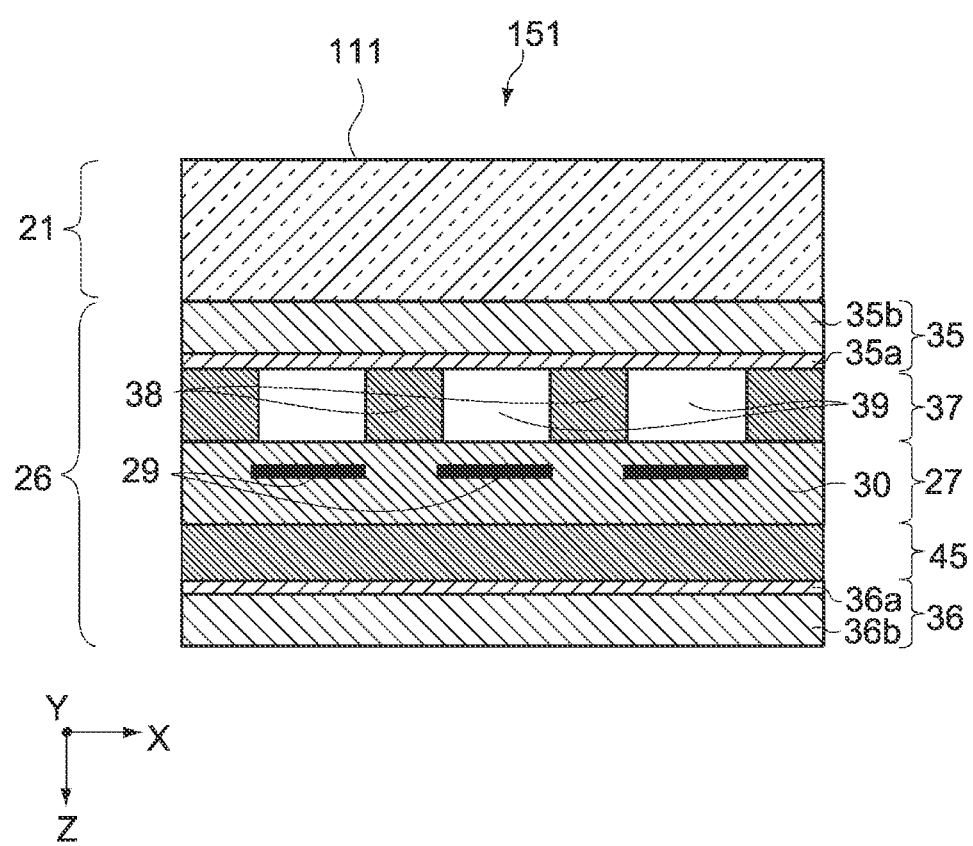
FIG. 16 is a cross-sectional view of a pressure distribution detecting sensor that can be used as the pressure-sensitive sensor included in the movable body.

FIG. 16 is a cross-sectional view of a pressure distribution detecting sensor 151 that can be used as the pressure-sensitive sensor 110. As illustrated in the figure, the pressure distribution detecting sensor 151 includes a clearance layer 21 and a sensor section 26 in order from above (from the outer side) in a stacking direction (a Z-axis direction).

The sensor section 26 is formed by stacking a first electrode film layer 35, a deformable layer 37, a sensor electrode layer 27, a fixation layer 45, and a second electrode film layer 36 in order from above (from the outer side) in the stacking direction (the Z-axis direction).

The sensor electrode layer 27 is flexible, and includes a base material 30 and a sensing portion 29 provided in the base material 30.

The sensing portion 29 is a capacitive sensor. The sensor electrode layer 27 includes the sensing portions 29 regularly arranged at specified intervals in a width direction (an X-direction) and in a length direction (a Y-direction). Each sensing portion 29 includes, for example, a pulse electrode in the form of comb teeth (not illustrated) and a sense electrode in the form of comb teeth (not illustrated).

The first electrode film layer 35 and the second electrode film layer 36 are arranged such that the sensor electrode layer 27 is situated between the first electrode film layer 35 and the second electrode film layer 36 in the stacking direction (the Z-direction).

The first electrode film layer 35 is flexible, and is formed by stacking a first film layer 35*b* and a first reference electrode layer 35*a*. The second electrode film layer 36 is also flexible, and is formed by stacking a second film layer 36*b* and a second reference electrode layer 36*a*. The first reference electrode layer 35*a* and the second reference electrode layer 36*a* are ground electrodes, and are at the ground potential.

The fixation layer 45 is situated between the sensor electrode layer 27 and the second electrode film layer 36. The fixation layer 45 adjusts a distance (a gap) between the sensor electrode layer 27 and the second reference electrode layer 36*a* in the stacking direction (the Z-direction).

The deformable layer 37 is situated between the sensor electrode layer 27 and the first electrode film layer 35. The deformation layer 37 is elastically deformable due to an external force applied by a user.

The deformable layer 37 includes a patterning structure and a hollow portion 39 in which there exists no patterning structure. The patterning structure includes a plurality of pillar portions 38 spaced from each other in a direction (an XY-direction) that is horizontal to the respective layers. Further, the hollow portion 39 is a position in which there exists no pillar portion 38. Each of the plurality of pillar portions 38 in the deformable layer 37 is arranged in a position that does not correspond to the sensing portion 29 in the sensor electrode layer 27 in the stacking direction (the Z-direction).

The clearance layer 21 is arranged outside of the sensor section 26 to face the first electrode film layer 35. The clearance layer 21 is stacked on a push-in layer 23 through a bonding layer 22. The clearance layer 21 is elastically deformable.

Figure 17:
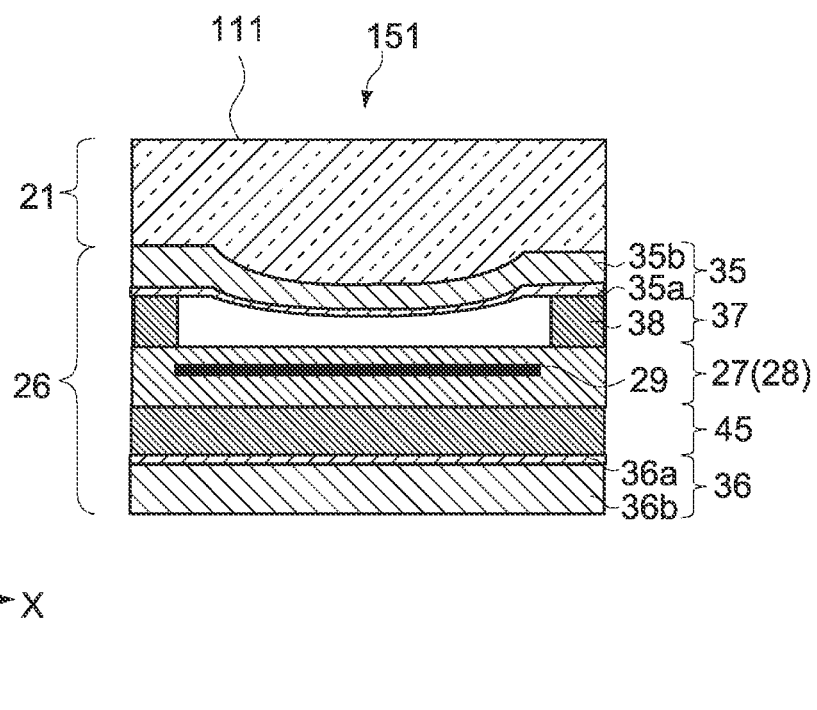
FIG. 17 illustrates a state in which an external force is applied to the pressure distribution detecting sensor.

The pressure distribution detecting sensor 151 has the configuration described above. FIG. 17 illustrates a state in which an external force is applied to the pressure distribution detecting sensor 151. As illustrated in the figure, when an external force is applied to the pressure distribution detecting sensor 151, the clearance layer 21 absorbs the external force to collapse, and the clearance layer 21 pushes the first electrode film layer 35 toward the sensor electrode layer 27.

When the first electrode film layer 35 is pushed, the deformation layer 37 is elastically deformed, and thus the first reference electrode layer 35*a* (ground potential) is situated closer to the sensing portion 29 in the sensor electrode layer 27. Here, there is a change in the capacitance between the pulse electrode and the sense electrode in the sensing portion 29. Thus, the pressure distribution detecting sensor 151 can detect the change in the capacitance as a pressure value, and can detect a pressure distribution from coordinates of the sensing portion 29.

The pressure distribution detecting sensor 151 can be used as the pressure-sensitive sensor 110 by the side of the second electrode film layer 36 being attached to the surface (such as a body) of the movable body 100. The surface of the clearance layer 21 serves as the detection surface 111.

<Second Structure of Pressure-Sensitive Sensor>

Figure 18:
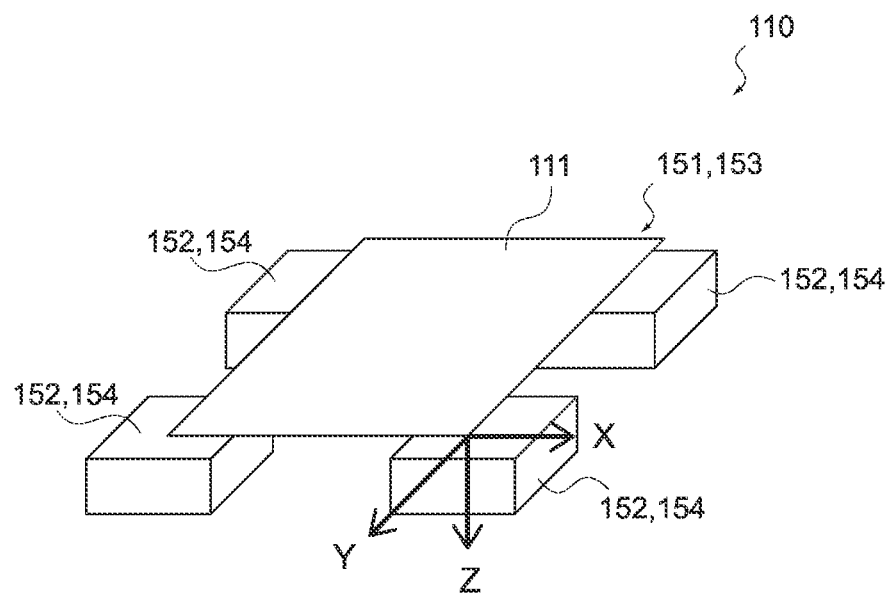
FIG. 18 schematically illustrates the pressure-sensitive sensor included in the movable body.

As illustrated in FIG. 18, the pressure-sensitive sensor 110 may also have a configuration obtained by combining the pressure distribution detecting sensor 151 and a shearing force detecting sensor 152. As illustrated in the figure, the pressure-sensitive sensor 110 may be formed by stacking the pressure distribution detecting sensor 151 on the shearing force detecting sensor 152. For example, the shearing force detecting sensor 152 is arranged at four corners of the pressure distribution detecting sensor 151.

The pressure distribution detecting sensor 151 detects a distribution of pressure in the Z-direction, as described above. The shearing force detecting sensor 152 detects a shearing force when the pressure distribution detecting sensor 151 is subjected to a shearing force in the X-direction and in the Y-direction. The shearing force detecting sensor 152 may be in the form of, for example, a semiconductor strain-gauge chip having a micro-electro-mechanical systems (MEMS) structure.

<Third Structure of Pressure-Sensitive Sensor>

As illustrated in FIG. 18, the pressure-sensitive sensor 110 may also have a configuration obtained by combining a touch panel 153 and a pressure-and-shearing-force detecting sensor 154. As illustrated in the figure, the pressure-sensitive sensor 110 may be formed by stacking the touch panel 153 on the pressure-and-shearing-force detecting sensor 154. For example, the pressure-and-shearing-force detecting sensor 154 is arranged at four corners of the touch panel 153.

The touch panel 153 includes the detection surface 111, and detects a contact with the detection surface 111. The touch panel 153 may be, for example, a capacitive touch panel, or may be a touch panel of another type. When the detection surface 111 is pressed, pressure is detected by the pressure-and-shearing-force detecting sensor 154, and a pressure distribution is detected by combining, with the detected pressure, a result of the detection performed by the touch panel 153.

The pressure-and-shearing-force detecting sensor 154 detects a shearing force when the touch panel 153 is subjected to a shearing force in the X-direction and in the Y-direction. The pressure-and-shearing-force detecting sensor 154 may be in the form of, for example, a semiconductor strain-gauge chip having a MEMS structure.

<Fourth Structure of Pressure-Sensitive Sensor>

Figure 19:
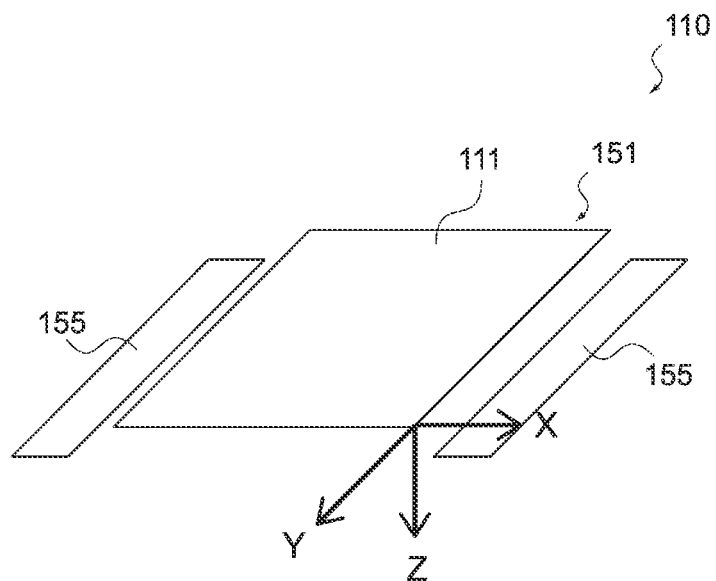
FIG. 19 schematically illustrates the pressure-sensitive sensor included in the movable body.

As illustrated in FIG. 19, the pressure-sensitive sensor 110 may also have a configuration obtained by combining the pressure distribution detecting sensor 151 and a shearing force detecting electrode 155. FIG. 19 schematically illustrates a configuration of the pressure-sensitive sensor 110 including the pressure distribution detecting sensor 151 and the shearing force detecting electrode 155. As illustrated in the figure, the pressure-sensitive sensor 110 may be formed by arranging the shearing force detecting electrode 155 around the pressure distribution detecting sensor 151. For example, the shearing force detecting electrode 155 is arranged outside of four sides of the pressure distribution detecting sensor 151.

The pressure distribution detecting sensor 151 detects a distribution of pressure in the Z-direction, as described above. When the pressure distribution detecting sensor 151 is subjected to a shearing force in the X-direction and in the Y-direction, the shearing force detecting electrode 155 detects displacement of the pressure distribution detecting sensor 151 in the X-direction and in the Y-direction as a change in capacitance between electrodes (the sensing portion 29) of the pressure distribution detecting sensor 151.

<Fifth Structure of Pressure-Sensitive Sensor>

Figure 20:
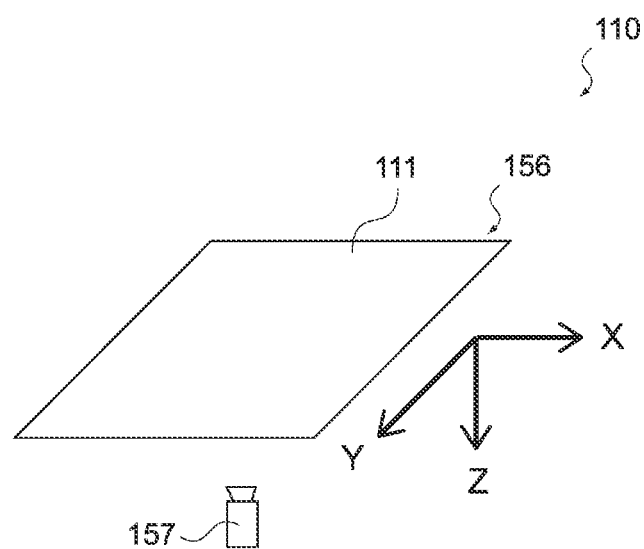
FIG. 20 schematically illustrates the pressure-sensitive sensor included in the movable body.

The pressure-sensitive sensor 110 may also have a configuration in which a transparent member and a camera are included. FIG. 20 schematically illustrates a configuration of the pressure-sensitive sensor 110 including a transparent member 156 and an image sensor 157. As illustrated in the figure, one of the surfaces of the transparent member 156 is the detection surface 111, and the image sensor 157 captures an image of the transparent member 156 from a side opposite to the side of the detection surface 111. The image sensor 157 converts a change in a shape of a pressing object into an image. AI machine learning is performed on this image, and this makes it possible to estimate a pressure distribution and a shearing force.

The pressure-sensitive sensor 110 may have the various configurations described above. Further, in addition to the configurations described above, the pressure-sensitive sensor 110 may have any configuration that makes it possible to detect at least a distribution of pressure applied to the detection surface 111, using, for example, a change in capacitance, a change in electrical resistance, an ultrasonic wave, or an optical or piezoelectric element. It is favorable that the pressure-sensitive sensor 110 also be capable of detecting a shearing force. Note that the pressure-sensitive sensors 110 of a plurality of approaches may be included in a single movable body 100, such as the fact that the pressure-sensitive sensors 110 of different approaches are included with respect to a body and a window of an automobile.

[Type of Movable Body and Arrangement of Pressure-Sensitive Sensor]

The type of the movable body 100 is not particularly limited, and it is sufficient if the movable body 100 can move. In various movable bodies 100, the detection surface 111 of the pressure-sensitive sensor 110 may be arranged in a portion that can be easily touched with the hand or foot. FIGS. 21 to 24 schematically illustrate various movable bodies 100 and arrangements of the detection surface 111.

Figure 21:
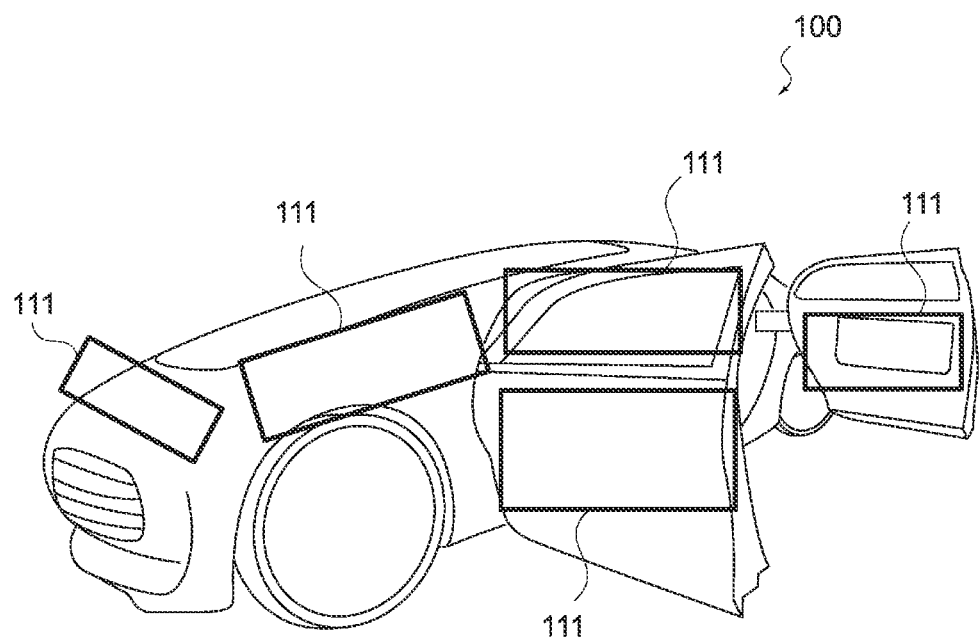
FIG. 21 schematically illustrates an arrangement of the detection surface in the movable body.
Figure 22:
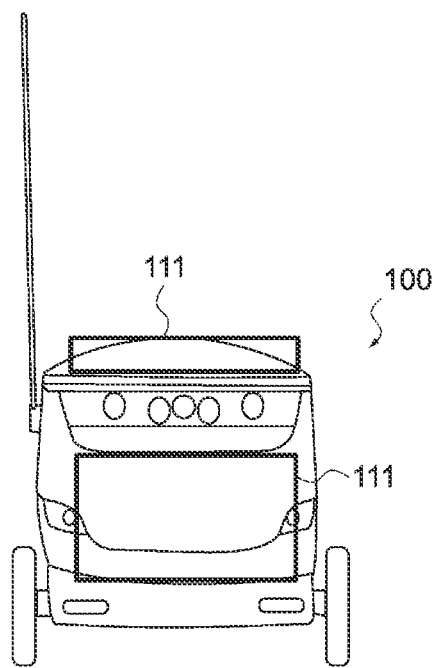
FIG. 22 schematically illustrates an arrangement of the detection surface in the movable body.

As illustrated in FIG. 21, the movable body 100 may be a sedan. In this case, the detection surface 111 may be arranged, for example, on a hood, inside or outside of a door, on a window, on a grip, or on a grip of a pillar. As illustrated in FIG. 22, the movable body 100 may be a delivery robot. In this case, the detection surface 111 may be arranged, for example, on a front surface or on a top surface.

Figure 23:
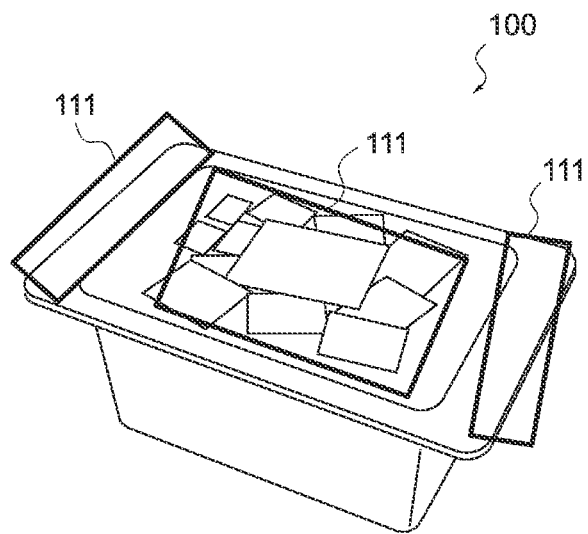
FIG. 23 schematically illustrates an arrangement of the detection surface in the movable body.
Figure 24:
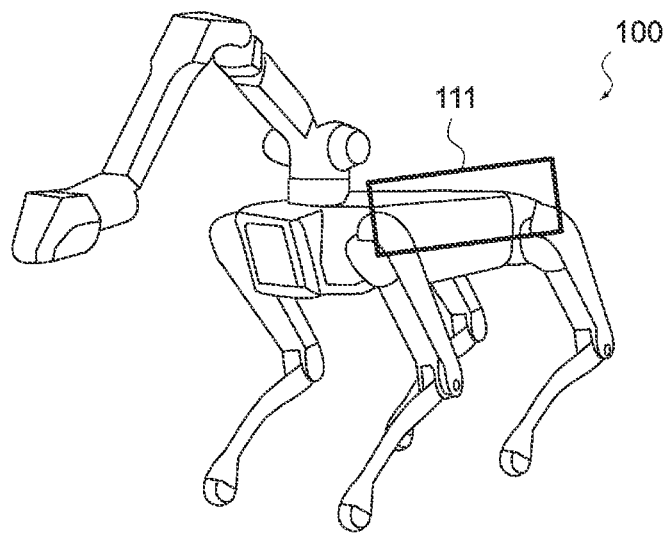
FIG. 24 schematically illustrates an arrangement of the detection surface in the movable body.

As illustrated in FIG. 23, the movable body 100 may be a robot table. In this case, the detection surface 111 may be arranged, for example, on a table surface. As illustrated in FIG. 24, the movable body 100 may be a four-legged robot. In this case, the detection surface 111 may be arranged, for example, on the back.

[Hardware Configuration]

Figure 25:
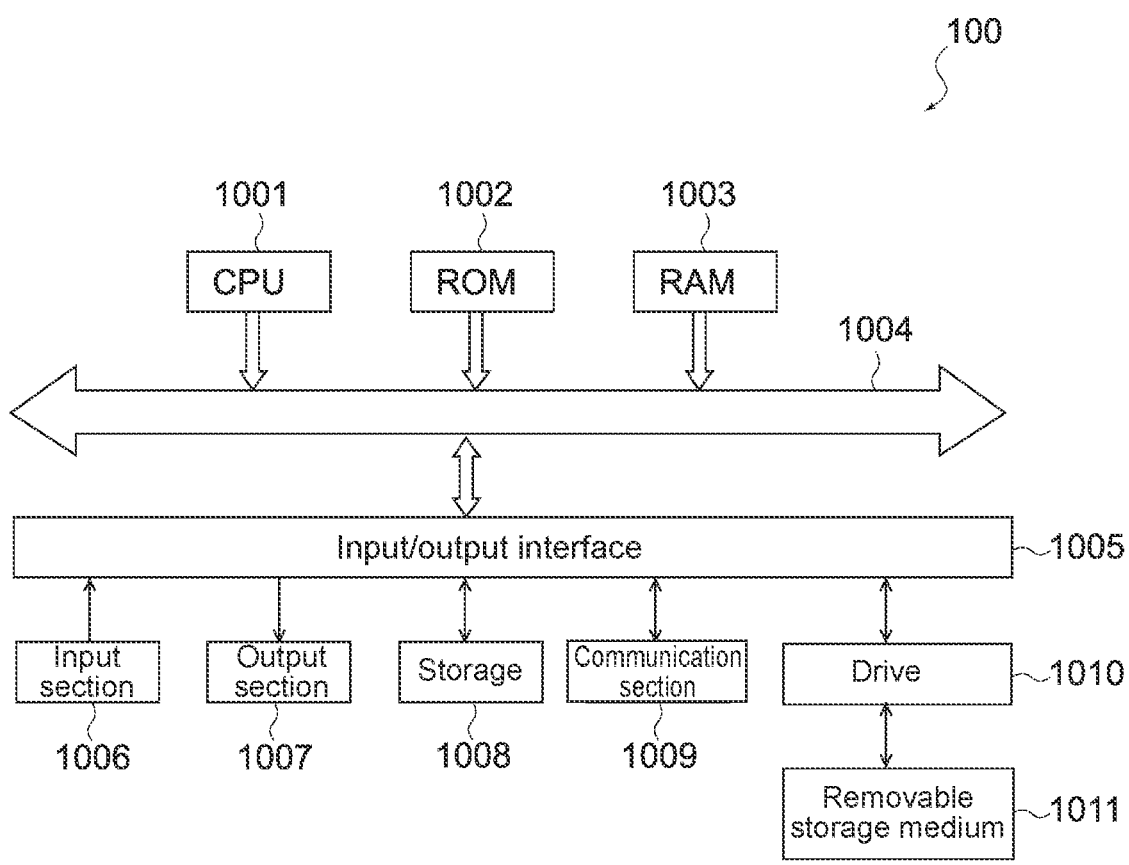
FIG. 25 is a block diagram illustrating a hardware configuration of a movement control apparatus included in the movable body.

A hardware configuration of the movement control apparatus 130 is described. FIG. 25 schematically illustrates a hardware configuration of the movement control apparatus 130. As illustrated in the figure, the movement control apparatus 130 includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input section 1006, an output section 1007, a storage 1008, and a communication section 1009 are connected to the input/output interface 1005. The input section 1006 includes input devices such as a keyboard and a mouse that are used by a user to input an operation command. The output section 1007 outputs a processing operation screen and an image of a processing result to a display device. The storage 1008 includes, for example, a hard disk drive that stores therein a program and various data. The communication section 1009 includes, for example, a local area network (LAN) adapter, and performs communication processing through a network as represented by the Internet. Further, a drive 1010 is connected to the input/output interface 1005. The drive 1010 reads data from and writes data into a removable storage medium 1011 such as a magnetic disk, an optical disk, a magneto-optical disk, or a semiconductor memory.

The CPU 1001 performs various processes in accordance with a program stored in the ROM 1002, or in accordance with a program that is read from the removable storage medium 1011 such as a magnetic disk, an optical disk, a magneto-optical disk, or a semiconductor memory to be installed on the storage 1008, and is loaded into the RAM 1003 from the storage 1008. Data necessary for the CPU 1001 to perform various processes is also stored in the RAM 1003 as necessary.

In the movement control apparatus 130 having the configuration described above, the series of processes described above is performed by the CPU 1001 loading, for example, a program stored in the storage 1008 into the RAM 1003 and executing the program via the input/output interface 1005 and the bus 1004.

For example, the program executed by the movement control apparatus 130 can be provided by being recorded in the removable storage medium 1011 serving as, for example, a package medium. Further, the program can be provided via a wired or wireless transmission medium such as a local area network, the Internet, or digital satellite broadcasting.

In the movement control apparatus 130, the program can be installed on the storage 1008 via the input/output interface 1005 by the removable storage medium 1011 being mounted on the drive 1010. Further, the program can be received by the communication section 1009 via the wired or wireless transmission medium to be installed on the storage 1008. Moreover, the program can be installed in advance on the ROM 1002 or the storage 1008.

Note that the program executed by the movement control apparatus 130 may be a program in which processes are chronologically performed in the order of the description in the present disclosure, or may be a program in which processes are performed in parallel or a process is performed at a necessary timing such as a timing of calling.

All of the hardware configuration of the movement control apparatus 130 does not have to be included in a single apparatus, and the movement control apparatus 130 may include a plurality of apparatuses. Further, a portion of or all of the hardware configuration of the movement control apparatus 130 may be included in a plurality of apparatuses connected to each other via a network.

Moreover, the present technology is not limited to the embodiments described above, and of course various modifications may be made thereto without departing from the scope of the present technology.

Note that the present technology may also take the following configurations.

(1) A movement control apparatus, including:
  a motion controller that causes a movable body to perform motion; and
  an operation instructing section that gives an instruction to the motion controller on the basis of output of a sensor such that the movable body performs motion, the sensor detecting a distribution of pressure applied to a detection surface.

(2) The movement control apparatus according to (1), in which
  the operation instructing section acquires the distribution of the pressure and a shearing force from the sensor, the pressure being a force in a direction orthogonal to the detection surface, the shearing force being a force in a direction parallel to the detection surface, and
  the operation instructing section gives the instruction to the motion controller on the basis of the pressure and the shearing force.

(3) The movement control apparatus according to (2), in which
  when the pressure or the shearing force is applied to the detection surface in a traveling direction of the movable body while the movable body is stopped, the operation instructing section gives the instruction to the motion controller such that the movable body starts moving.

(4) The movement control apparatus according to (2), in which
  The movement control apparatus according to claim 2, wherein
  when the pressure or the shearing force is applied to the detection surface in a direction opposite to the traveling direction of the movable body while the movable body is moving, the operation instructing section gives the instruction to the motion controller such that the movable body is stopped.

(5) The movement control apparatus according to (2), in which
  when the pressure or the shearing force is applied to the detection surface, the operation instructing section gives the instruction to the motion controller while the pressure or the shearing force is being applied, such that the movable body moves in a direction in which the pressure or the shearing force is being applied.

(6) The movement control apparatus according to any one of (2) to (5), in which
  from the distribution of the pressure applied to the detection surface, the operation instruction section acquires the type of a pressing object pressed against the detection surface, and the number of the pressing objects, and
  the operation instruction section gives the instruction to the motion controller according to the type of the pressing object and the number of the pressing objects.

(7) The movement control apparatus according to (6), in which
  when the pressing object is a certain number of fingers or more, or a palm of a hand, the operation instructing section gives the instruction to the motion controller according to the output of the sensor, and
  when the pressing object is fewer than the certain number of fingers, the operation instructing section does not give the instruction to the motion controller according to the output of the sensor.

(8) The movement control apparatus according to (6), in which
  when the pressing object is a single hand, the operation instructing section gives the instruction to the motion controller such that the movable body goes straight, and
  when the pressing object is a plurality of hands, the operation instructing section gives the instruction to the motion controller such that the movable body moves with a turn.

(9) The movement control apparatus according to any one of (2) to (8), in which
  the operation instructing section
    identifies a user who is pressing the detection surface, determines a set value according to a result of the identification, and gives the instruction to the motion controller on the basis of the output of the sensor when the pressure or the shearing force exhibits a value greater than the set value.

(10) The movement control apparatus according to any one of (2) to (9), in which
when the detection surface is pressed in a state in which a destination of the movable body in autonomous driving has been set, the operation instructing section gives the instruction to the motion controller such that the movable body moves toward the destination.

(11) The movement control apparatus according to (10), in which
when the detection surface is pressed after the movable body leaves for the destination, the operation instructing section gives the instruction to the motion controller such that the movable body is stopped.

(12) The movement control apparatus according to any one of (2) to (11), in which
according to an angle formed by the detection surface and a movement direction that is a direction in which the movable body is movable, the operation instructing section selects a force used to give the instruction to the motion controller from the pressure and the shearing force.

(13) The movement control apparatus according to (12), in which
when the detection surface is parallel to the movement direction, the operation instructing section uses the shearing force to give the instruction to the motion controller, and
when the detection surface is orthogonal to the movement direction, the operation instructing section uses the pressure, and the shearing force in a direction parallel to the movement direction to give the instruction to the motion controller.

(14) The movement control apparatus according to any one of (2) to (13), in which
when the detection surface is pressed with a pressing object while the movable body is moving, the operation instructing section gives the instruction to the motion controller such that the movable body moves while keeping in contact with the pressing object.

(15) A movable body, including:
a sensor that detects a distribution of pressure applied to a detection surface;
a traveling apparatus that causes the movable body to perform motion;
a motion controller that controls the traveling apparatus such that the movable body performs motion; and
an operation instructing section that gives an instruction to the motion controller on the basis of output of the sensor such that the movable body performs motion.

(16) The movable body according to (15), in which
the sensor includes a shearing force detecting sensor that detects a shearing force, and a pressure distribution detecting sensor that is stacked on the shearing force detecting sensor and detects the distribution of the pressure, the shearing force being a force in a direction parallel to the detection surface, the pressure being a force in a direction orthogonal to the detection surface.

(17) The movable body according to (15), in which
the sensor includes a pressure-and-shearing-force detecting sensor that detects the pressure and a shearing force, and a touch sensor that is stacked on the pressure-and-shearing-force detecting sensor and detects a contact with the detection surface, the pressure being a force in a direction orthogonal to the detection surface, the shearing force being a force in a direction parallel to the detection surface.

(18) The movable body according to (15), in which
the sensor includes a pressure distribution detecting sensor that detects the distribution of the pressure, and a shearing force detecting electrode that is arranged around the pressure distribution detecting sensor and detects displacement of the pressure distribution detecting sensor, the pressure being a force in a direction orthogonal to the detection surface, the displacement being displacement in a direction parallel to the detection surface.

(19) The movable body according to (18), in which
the sensor includes a transparent member that includes the detection surface, and an image sensor that converts, into an image, a change in a shape of a pressing object pressed against the detection surface, the sensor detecting the pressure and a shearing force on the basis of the change in the shape of the pressing object, the pressure being a force in a direction orthogonal to the detection surface, the shearing force being a force in a direction parallel to the detection surface.

(20) The movable body according to any one of (15) to (19), in which
the movable body is an autonomous vehicle, or a robot including an autonomous movement function.

REFERENCE SIGNS LIST 100 movable body
110 pressure-sensitive sensor
111 detection surface
120 traveling apparatus
130 movement control apparatus
131 operation instructing section
132 motion controller
151 pressure distribution detecting sensor
152 shearing force detecting sensor
153 touch panel
154 pressure-and-shearing-force detecting sensor
155 shearing force detecting electrode
156 transparent member
157 image sensor
160 instruction block
170 driving block
180 comfortable equipment block

The invention claimed is:
1. A movement control apparatus, comprising:
a motion controller that causes a movable body to perform motion; and
an operation instructing section that gives an instruction to the motion controller on a basis of output of a sensor such that the movable body performs motion, the sensor detecting a distribution of pressure applied to a detection surface, wherein
the detection surface is provided on a first side of a clearance layer, and a second side of the clearance layer is stacked on a sensor section that includes the sensor,
the distribution of pressure applied to the detection surface that is detected is applied by a shape with the distribution of pressure being in a Z-direction within an XY-plane of the detection surface, and a plurality of sensing portions across the X-direction and Y-direction in the XY-plane detecting a pressure in the Z-direction resulting in the detected distribution of pressure applied to the detection surface, the operation instructing section acquires the distribution of the pressure and a shearing force from the sensor, the pressure being a force in a direction orthogonal to the detection surface, the shearing force being a force in a direction parallel to the detection surface, the operation instructing section gives the instruction to the motion controller on a basis of the pressure and the shearing force, and the operation instructing section
identifies a user who is pressing the detection surface, determines a set value according to a result of the identification, and
gives the instruction to the motion controller on the basis of the output of the sensor when the pressure or the shearing force exhibits a value greater than the set value.

2. The movement control apparatus according to claim 1, wherein
when the pressure or the shearing force is applied to the detection surface in a traveling direction of the movable body while the movable body is stopped, the operation instructing section gives the instruction to the motion controller such that the movable body starts moving.

3. The movement control apparatus according to claim 1, wherein
when the pressure or the shearing force is applied to the detection surface in a direction opposite to the traveling direction of the movable body while the movable body is moving, the operation instructing section gives the instruction to the motion controller such that the movable body is stopped.

4. The movement control apparatus according to claim 1, wherein
when the pressure or the shearing force is applied to the detection surface, the operation instructing section gives the instruction to the motion controller while the pressure or the shearing force is being applied, such that the movable body moves in a direction in which the pressure or the shearing force is being applied.

5. The movement control apparatus according to claim 1, wherein
from the distribution of the pressure applied to the detection surface, the operation instruction section acquires the type of a pressing object pressed against the detection surface, and the number of the pressing objects, and
the operation instruction section gives the instruction to the motion controller according to the type of the pressing object and the number of the pressing objects.

6. The movement control apparatus according to claim 5, wherein
when the pressing object is a certain number of fingers or more, or a palm of a hand, the operation instructing section gives the instruction to the motion controller according to the output of the sensor, and
when the pressing object is fewer than the certain number of fingers, the operation instructing section does not give the instruction to the motion controller according to the output of the sensor.

7. The movement control apparatus according to claim 5, wherein
when the pressing object is a single hand, the operation instructing section gives the instruction to the motion controller such that the movable body goes straight, and when the pressing object is a plurality of hands, the operation instructing section gives the instruction to the motion controller such that the movable body moves with a turn.

8. The movement control apparatus according to claim 1, wherein
when the detection surface is pressed in a state in which a destination of the movable body in autonomous driving has been set, the operation instructing section gives the instruction to the motion controller such that the movable body moves toward the destination.

9. The movement control apparatus according to claim 8, wherein
when the detection surface is pressed after the movable body leaves for the destination, the operation instructing section gives the instruction to the motion controller such that the movable body is stopped.

10. The movement control apparatus according to claim 1, wherein
according to an angle formed by the detection surface and a movement direction that is a direction in which the movable body is movable, the operation instructing section selects a force used to give the instruction to the motion controller from the pressure and the shearing force.

11. The movement control apparatus according to claim 10, wherein
when the detection surface is parallel to the movement direction, the operation instructing section uses the shearing force to give the instruction to the motion controller, and
when the detection surface is orthogonal to the movement direction, the operation instructing section uses the pressure, and the shearing force in a direction parallel to the movement direction to give the instruction to the motion controller.

12. The movement control apparatus according to claim 1, wherein
when the detection surface is pressed with a pressing object while the movable body is moving, the operation instructing section gives the instruction to the motion controller such that the movable body moves while keeping in contact with the pressing object.

13. A movable body, comprising:
a sensor that detects a distribution of pressure applied to a detection surface;
a traveling apparatus that causes the movable body to perform motion;
a motion controller that controls the traveling apparatus such that the movable body performs motion; and
an operation instructing section that gives an instruction to the motion controller on a basis of output of the sensor such that the movable body performs motion, wherein
the detection surface is provided on a first side of a clearance layer, and a second side of the clearance layer is stacked on a sensor section that includes the sensor,
the distribution of pressure applied to the detection surface that is detected is applied by a shape with the distribution of pressure being in a Z-direction within an XY-plane of the detection surface, and a plurality of sensing portions across the X-direction and Y-direction in the XY-plane detecting a pressure in the Z-direction resulting in the detected distribution of pressure applied to the detection surface,
the operation instructing section acquires the distribution of the pressure and a shearing force from the sensor, the pressure being a force in a direction orthogonal to the detection surface, the shearing force being a force in a direction parallel to the detection surface, the operation instructing section gives the instruction to the motion controller on a basis of the pressure and the shearing force, and the operation instructing section
- identifies a user who is pressing the detection surface,
- determines a set value according to a result of the identification, and
- gives the instruction to the motion controller on the basis of the output of the sensor when the pressure or the shearing force exhibits a value greater than the set value.

14. The movable body according to claim 13, wherein the sensor includes a shearing force detecting sensor that detects a shearing force, and a pressure distribution detecting sensor that is stacked on the shearing force detecting sensor and detects the distribution of the pressure, the shearing force being a force in a direction parallel to the detection surface, the pressure being a force in a direction orthogonal to the detection surface.

15. The movable body according to claim 13, wherein the sensor includes a pressure-and-shearing-force detecting sensor that detects the pressure and a shearing force, and a touch sensor that is stacked on the pressure-and-shearing-force detecting sensor and detects a contact with the detection surface, the pressure being a force in a direction orthogonal to the detection surface, the shearing force being a force in a direction parallel to the detection surface.

16. The movable body according to claim 13, wherein the sensor includes a pressure distribution detecting sensor that detects the distribution of the pressure, and a shearing force detecting electrode that is arranged around the pressure distribution detecting sensor and detects displacement of the pressure distribution detecting sensor, the pressure being a force in a direction orthogonal to the detection surface, the displacement being displacement in a direction parallel to the detection surface.

17. The movable body according to claim 13, wherein the sensor includes a transparent member that includes the detection surface, and an image sensor that converts, into an image, a change in a shape of a pressing object pressed against the detection surface, the sensor detecting the pressure and a shearing force on a basis of the change in the shape of the pressing object, the pressure being a force in a direction orthogonal to the detection surface, the shearing force being a force in a direction parallel to the detection surface.

18. The movable body according to claim 13, wherein the movable body is an autonomous vehicle, or a robot including an autonomous movement function.

* * * * *